(12) United States Patent
Nishi

(10) Patent No.: US 11,290,652 B2
(45) Date of Patent: Mar. 29, 2022

(54) ELECTRONIC APPARATUS AND CONTROL PROGRAM

(71) Applicant: NIKON CORPORATION, Tokyo (JP)

(72) Inventor: Takeshi Nishi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 14/760,953

(22) PCT Filed: May 31, 2013

(86) PCT No.: PCT/JP2013/065264
§ 371 (c)(1),
(2) Date: Jul. 14, 2015

(87) PCT Pub. No.: WO2014/192152
PCT Pub. Date: Dec. 4, 2014

(65) Prior Publication Data
US 2016/0112644 A1    Apr. 21, 2016

(51) Int. Cl.
*H04N 5/232*  (2006.01)
*H04N 5/374*  (2011.01)
(Continued)

(52) U.S. Cl.
CPC ......... *H04N 5/232935* (2018.08); *G06T 7/11* (2017.01); *G06T 7/194* (2017.01);
(Continued)

(58) Field of Classification Search
CPC . H04N 5/355–3559; H04N 5/235–243; H04N 5/353–3537; G03B 9/58–62;
(Continued)

(56) References Cited

U.S. PATENT DOCUMENTS

2006/0023109 A1    2/2006  Mabuchi et al.
2006/0197007 A1    9/2006  Iwabuchi et al.
(Continued)

FOREIGN PATENT DOCUMENTS

JP    2003-259211 A    9/2003
JP    2004340991 A    12/2004
(Continued)

OTHER PUBLICATIONS

Oct. 8, 2013 International Search Report issued in Japanese Patent Application PCT/JP2013/065264.
(Continued)

*Primary Examiner* — Xi Wang
(74) *Attorney, Agent, or Firm* — Oliff PLC

(57) ABSTRACT

To make a difference between respective accumulation conditions of first and second regions of a live view image and then to check the live view image for changes in an image corresponding to the changes in the accumulation conditions of the respective regions. An electronic apparatus includes an image-capture unit and a system control unit. The image-capture unit includes an image sensor and captures an image of first and second regions. The system control unit causes a display unit to display a live view image corresponding to the image of the first and second regions captured by the image-capture unit. The system control unit also makes a difference between respective accumulation conditions of the first and second regions of the live view image.

18 Claims, 23 Drawing Sheets

(51) Int. Cl.
    *H04N 5/353*    (2011.01)
    *G06T 7/194*    (2017.01)
    *G06T 7/11*     (2017.01)
    *H04N 5/369*    (2011.01)
    *H04N 9/04*     (2006.01)
(52) U.S. Cl.
    CPC ... *H04N 5/23216* (2013.01); *H04N 5/232939* (2018.08); *H04N 5/3535* (2013.01); *H04N 5/374* (2013.01); *H04N 5/379* (2018.08); *H04N 9/04557* (2018.08); *G06T 2207/10004* (2013.01)
(58) Field of Classification Search
    CPC .... G03B 7/00–28; G03B 2207/00–005; G06T 5/007–009; G06T 2207/20208
    USPC ........................... 348/362–368; 396/213–262
    See application file for complete search history.

(56) References Cited

U.S. PATENT DOCUMENTS

| | | | |
|---|---|---|---|
| 2007/0120987 A1* | 5/2007 | Kobayashi | H04N 9/735 348/223.1 |
| 2007/0195182 A1* | 8/2007 | Ito | H04N 5/23245 348/308 |
| 2007/0253694 A1* | 11/2007 | Miyazawa | G03B 7/08 396/234 |
| 2008/0048097 A1* | 2/2008 | Chen | H01L 27/14618 250/208.1 |
| 2008/0118155 A1 | 5/2008 | Yamashita | |
| 2008/0284871 A1 | 11/2008 | Kobayashi | |
| 2009/0290052 A1* | 11/2009 | Liu | H04N 5/35554 348/277 |
| 2010/0007780 A1 | 1/2010 | Nishihara | |
| 2011/0149129 A1 | 6/2011 | Kim et al. | |
| 2011/0228127 A1* | 9/2011 | Nakagawa | G02B 7/34 348/222.1 |
| 2012/0050565 A1* | 3/2012 | Imai | H04N 5/23293 348/224.1 |
| 2012/0069212 A1* | 3/2012 | Imai | H04N 5/142 348/223.1 |
| 2012/0188415 A1 | 7/2012 | Johnson | |
| 2012/0212639 A1* | 8/2012 | Gu | H01L 27/14643 348/222.1 |
| 2012/0274796 A1* | 11/2012 | Choi | H04N 5/23216 348/220.1 |
| 2012/0314124 A1* | 12/2012 | Kaizu | H04N 5/2353 348/362 |
| 2013/0070140 A1* | 3/2013 | Gove | G02B 3/0056 348/302 |
| 2013/0182165 A1* | 7/2013 | Kimura | H04N 5/335 348/311 |
| 2013/0300905 A1 | 11/2013 | Mabuchi et al. | |
| 2013/0308031 A1* | 11/2013 | Theuwissen | H04N 5/3454 348/308 |
| 2013/0308044 A1 | 11/2013 | Mitsunaga | |
| 2013/0329128 A1* | 12/2013 | Kaizu | H04N 5/2329 348/367 |
| 2014/0028825 A1* | 1/2014 | Yamagata | H04N 5/2621 348/77 |
| 2014/0104471 A1 | 4/2014 | Mabuchi et al. | |
| 2014/0168463 A1* | 6/2014 | Tamura | H04N 9/735 348/223.1 |
| 2014/0263964 A1* | 9/2014 | Yang | H04N 5/347 250/208.1 |
| 2015/0036878 A1* | 2/2015 | Nashizawa | G06T 5/50 382/103 |
| 2015/0077590 A1 | 3/2015 | Kuriyama et al. | |

FOREIGN PATENT DOCUMENTS

| | | |
|---|---|---|
| JP | 2005354568 A | 12/2005 |
| JP | 2006-049361 A | 2/2006 |
| JP | 2006197192 A | 7/2006 |
| JP | 2009-182832 A | 8/2009 |
| JP | 2009-246757 A | 10/2009 |
| JP | 2010021697 A | 1/2010 |
| JP | 2011-101159 A | 5/2011 |
| JP | 2013-088579 A | 5/2013 |

OTHER PUBLICATIONS

Dec. 1, 2015 International Preliminary Report on Patentability issued in International Patent Application No. PCT/JP2013/065264.
Jan. 9, 2017 Supplementary Search Report issued in European Patent Application No. 13885640.6.
Feb. 1, 2016 Office Action issued in Japanese Patent Application No. 2014-557907.
Sep. 28, 2016 Search Report issued in European Patent Application No. 13885640.6.
Jun. 12, 2020 Office Action issued in Chinese Patent Application No. 201811501809.7.
Apr. 15, 2021 Office Action issued in Chinese Patent Application No. 201811501809.7.
Sep. 1, 2020 Office Action issued in Japanese Patent Application No. 2018-182302.
Dec. 3, 2019 Office Action issued in Japanese Patent Application No. 2018-182302.
Feb. 11, 2019 Office Action issued in European Patent Application No. 13 885 640.6.
Jul. 3, 2017 Office Action issued in Chinese Patent Application No. 201380070839.6.
Nov. 15, 2021 Office Action issued in Chinese Patent Application No. 201811501809.7.

* cited by examiner

ELECTRONIC APPARATUS AND CONTROL PROGRAM

TECHNICAL FIELD

The present invention relates to an electronic apparatus and a control program.

BACKGROUND ART

Electronic apparatuses each including an image sensor in which a back-illuminated image-capture chip and a signal processing chip are stacked (hereafter referred to as a stacked image sensor) have been proposed (for example, see Patent Literature 1). In a stacked image sensor, a back-illuminated image-capture chip and a signal processing chip are stacked so as to be connected via micro-bumps corresponding to blocks each including multiple pixels.

PRIOR ART LITERATURE

Patent Literature

[Patent Literature 1] Japanese Unexamined Patent Application Publication No. 2006-49361

SUMMARY OF INVENTION

Technical Problem

However, there have been proposed only a few electronic apparatuses including a stacked image sensor which captures an image on a multiple-block basis. Accordingly, the usability of electronic apparatuses including a stacked image sensor has not been sufficiently improved.

An aspect of the present invention aims to make a difference between respective accumulation conditions of first and second regions of a live view image and then to check the live view image for changes in an image corresponding to the changes in the accumulation conditions of the respective regions.

Solution to Problem

A first aspect of the present invention provides an electronic apparatus. The electronic apparatus includes an image-capture unit which includes an image sensor and is capable of capturing an image of first and second regions, a control unit configured to cause a display unit to display a live view image corresponding to an image of the first and second regions captured by the image-capture unit, and a change unit configured to make a difference between respective accumulation conditions of the first and second regions of the live view image.

A second aspect of the present invention provides an electronic apparatus. The electronic apparatus includes a display unit capable of displaying a live view image corresponding to an image of first and second regions captured by an image-capture unit including an image sensor and a control unit configured to cause the display unit to display menus for setting image-capture conditions of the live view image while the live view image is displayed on the display unit.

A third aspect of the present invention provides a control program for causing a control device of an electronic apparatus to perform a display process of causing a display unit to display a live view image corresponding to an image of first and second regions captured by an image-capture unit, wherein the image-capture unit is included in the electronic apparatus, includes an image sensor, and is capable of capturing an image of the first and second regions, and a change process of making a difference between respective accumulation conditions of the first and second regions of the live view image.

A fourth aspect of the present invention provides a control program for causing a control device of an electronic apparatus to perform a first display process of causing a display unit to display a live view image corresponding to an image of first and second regions captured by an image-capture unit including an image sensor, wherein the display unit is included in the electronic apparatus and is capable of displaying the live view image, and a second display process of causing the display unit to display menus for setting image-capture conditions of the live view image while the first display process is performed.

Advantageous Effects of Invention

According to the aspects of the present invention, a difference is made between the respective accumulation conditions of the first and second regions of the live view image. Thus, it is possible to check the live view image for changes in an image corresponding to the changes in the accumulation conditions of the respective regions.

EMBODIMENTS OF THE INVENTION

Hereafter, embodiments of the present invention will be described with reference to the drawings. However, the present invention is not limited thereto. To clarify the embodiments, the drawings are scaled as appropriate, for example, partially enlarged or highlighted.

First Embodiment

Figure 1:
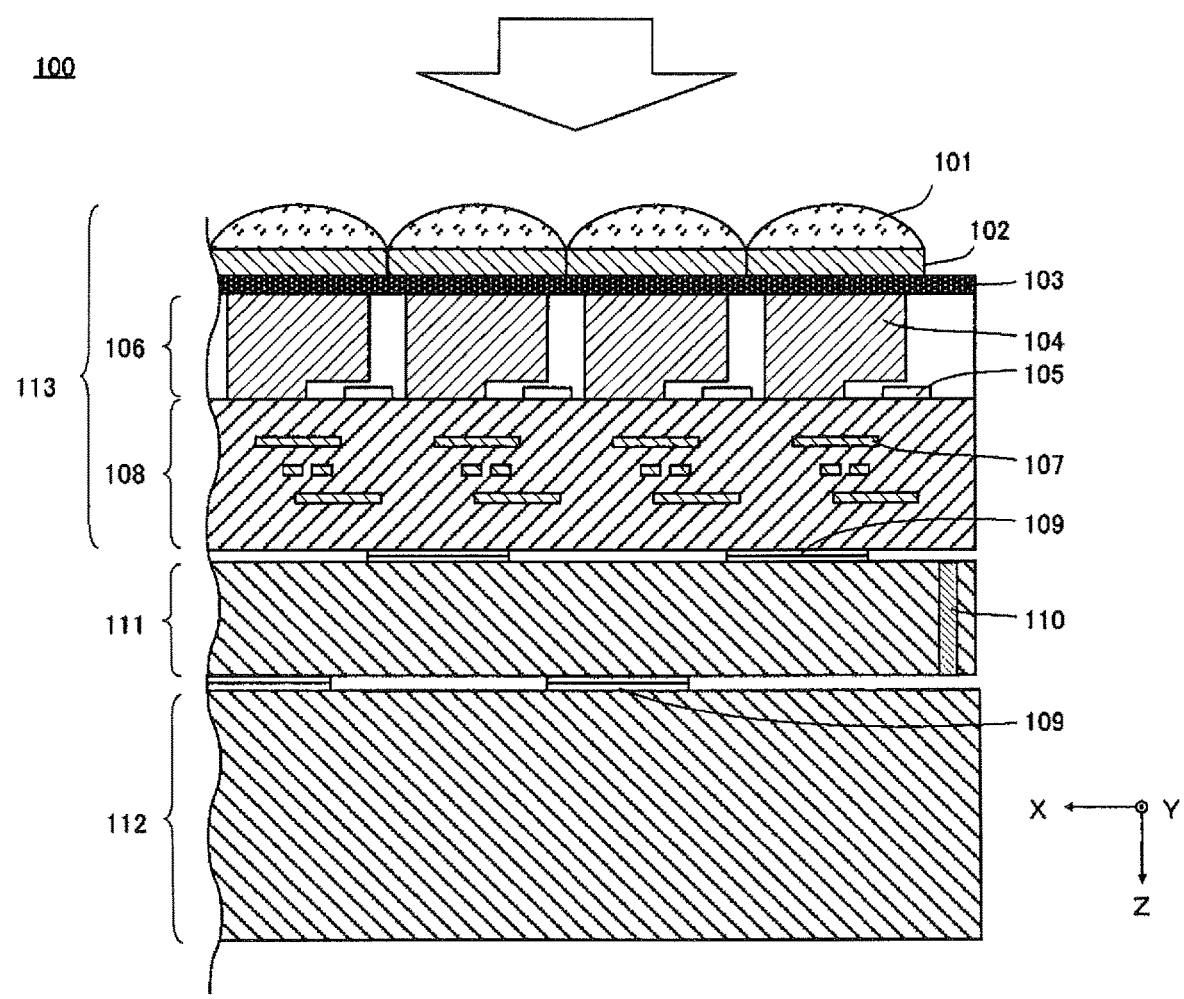
FIG. 1 is a sectional view of a stacked image sensor.

FIG. 1 is a sectional view of a stacked image sensor. A stacked image sensor 100 is disclosed in Japanese Patent Application No. 2012-139026 previously filed by the present applicant. The image sensor 100 includes an image-capture chip 113 configured to output a pixel signal corresponding to incident light, a signal processing chip 111 configured to process the pixel signal, and a memory chip 112 configured to store the pixel signal. The image-capture chip 113, signal processing chip 111, and memory chip 112 are stacked and electrically connected to one another via conductive bumps 109 such as Cu.

As shown in FIG. 1, incident light enters the image sensor 100 in a positive z-axis direction mainly shown by an outline arrow. In the present embodiment, the incident light entry surface of the image-capture chip 113 is referred to as a back surface. Further, as shown by coordinate axes, the direction which is perpendicular to the z-axis and oriented to the left side of the drawing is referred to as a positive x-axis direction, and the direction which is perpendicular to the z- and x-axes and oriented to the viewer is referred to as a positive y-axis direction. In the following some drawings, coordinate axes are shown using the coordinate axes of FIG. 1 as a reference so that the orientations of such drawings are understood.

One example of the image-capture chip 113 is a back-illuminated MOS image sensor. A PD layer 106 is disposed on the back surface of a wiring layer 108. The PD layer 106 includes multiple photodiodes (PDs) 104 disposed two-dimensionally and configured to accumulate charge corresponding to incident light and transistors 105 disposed in a manner corresponding to the PDs 104.

Color filters 102 are disposed over the incident light entry surface of the PD layer 106 with a passivation film 103 therebetween. The color filters 102 are each a filter which transmits a particular wavelength range of visible light. That is, the color filters 102 include multiple color filters which transmit different wavelength ranges and are arranged in a particular manner so as to correspond to the PDs 104. The arrangement of the color filters 102 will be described later. A set of a color filter 102, a PD 104, and a transistor 105 forms one pixel.

Microlenses 101 are disposed on the incident light entry sides of the color filters 102 in a manner corresponding to the pixels. The microlenses 101 condense incident light toward the corresponding PDs 104.

The wiring layer 108 includes lines 107 configured to transmit pixel signals from the PD layer 106 to the signal processing chip 111. The lines 107 may be multilayered and may include passive and active elements. Multiple bumps 109 are disposed on the front surface of the wiring layer 108 and aligned with multiple bumps 109 disposed on the opposite surface of the signal processing chip 111. The aligned bumps 109 are bonded together and electrically connected together, for example, by pressurizing the image-capture chip 113 and signal processing chip 111.

Similarly, multiple bumps 109 are disposed on the opposite surfaces of the signal processing chip 111 and memory chip 112 and aligned with each other. The aligned bumps 109 are bonded together and electrically connected together, for example, by pressurizing the signal processing chip 111 and memory chip 112.

The methods for bonding the bumps 109 together include Cu bump bonding using solid phase diffusion, as well as micro-bump bonding using solder melting. For the bumps 109, it is only necessary to provide, for example, one bump or so with respect to one unit group (to be discussed later). Accordingly, the size of the bumps 109 may be larger than the pitch between the PDs 104. Further, bumps which are larger than the bumps 109 corresponding to a pixel region having the pixels arranged therein (a pixel region 113A shown in FIG. 2) may be additionally provided in peripheral regions other than the pixel region.

The signal processing chip 111 includes a through-silicon via (TSV) 110 configured to connect together circuits disposed on the front and back surfaces thereof. The TSV 110 is disposed in a peripheral region. Alternatively, the TSV 110 may be disposed in a peripheral region of the image-capture chip 113 or in the memory chip 112.

Figure 2:
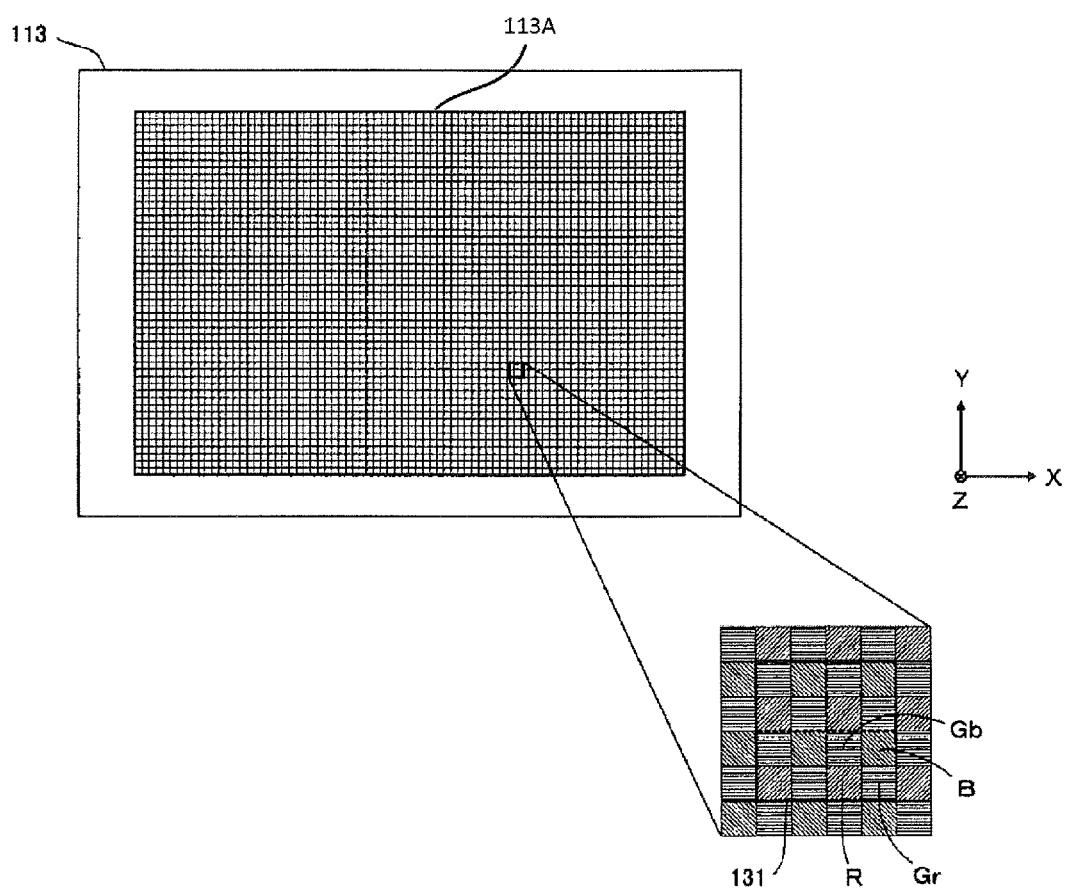
FIG. 2 is a diagram showing the pixel array of an image-capture chip and a unit group.

FIG. 2 is a diagram showing the pixel array of the image-capture chip and a unit group. In FIG. 2, the image-capture chip 113 is observed from the back side. The pixel region 113A is the pixel-arranged region of the image-capture chip 113. In the pixel region 113A, 20 million or more pixels are arranged in a matrix. In an example shown in FIG. 2, four adjacent pixels×four adjacent pixels, that is, 16 pixels form one unit group 131. Grid lines in FIG. 2 show a concept that adjacent pixels are grouped into unit groups 131. The number of pixels forming the unit groups 131 is not limited to that described above and may be on the order of 1000, for example, 32 pixels×64 pixels, or may be 1000 or more or less than 1000.

As shown in a partial enlarged view of the pixel region 113A, one unit group 131 includes four so-called Bayer arrays which each includes four pixels, that is, green pixels Gb, Gr, a blue pixel B, and a red pixel R and which are arranged vertically and horizontally. The green pixels are each a pixel having a green filter as a color filter 102 and receive light in the green wavelength band of incident light. Similarly, the blue pixel is a pixel having a blue filter as a color filter 102 and receives light in the blue wavelength band. The red pixel is a pixel having a red filter as a color filter 102 and receives light in the red wavelength band.

Figure 3:
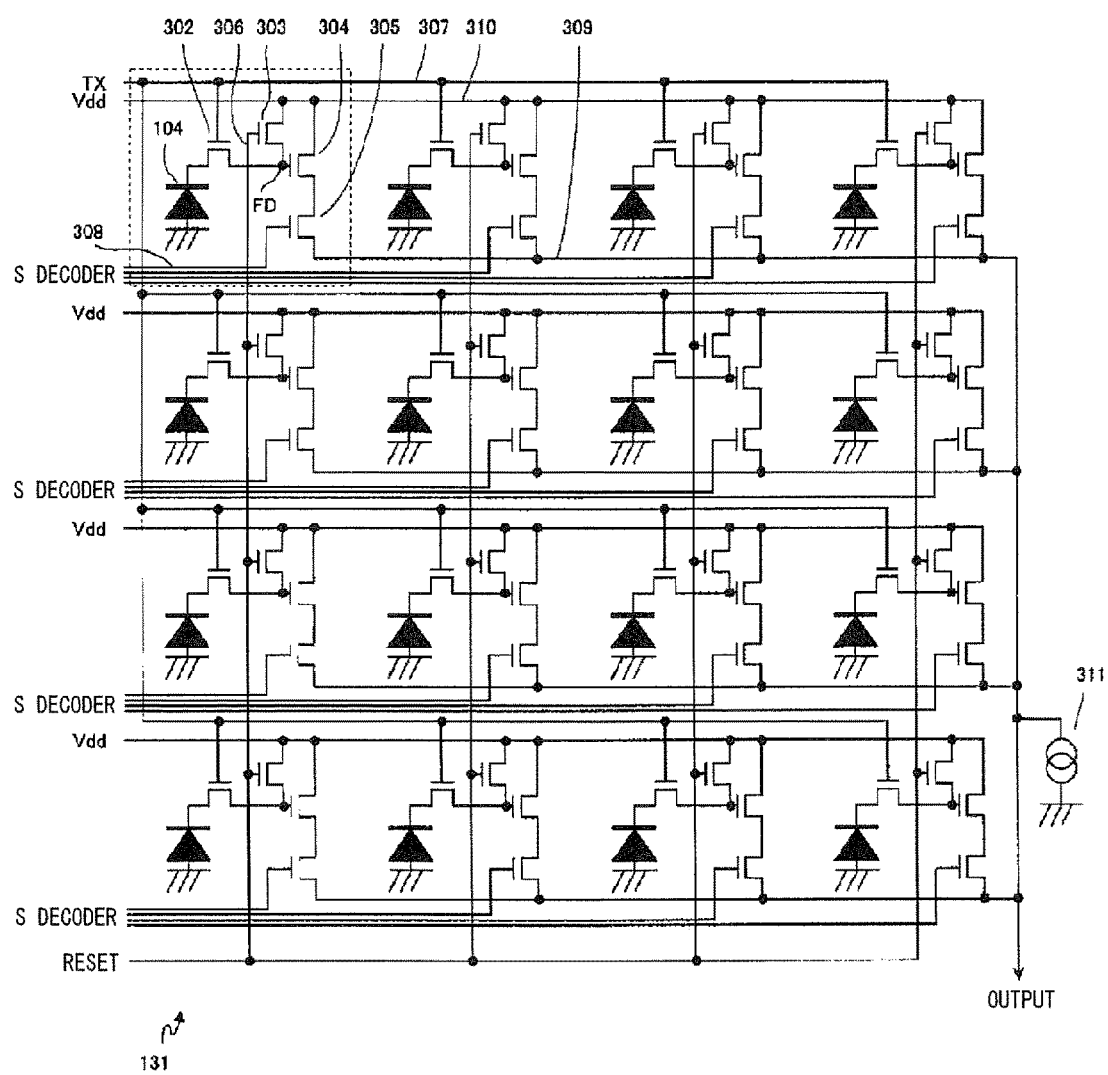
FIG. 3 is a circuit diagram of a unit group of the image-capture chip.

FIG. 3 is a circuit diagram of a unit group of the image-capture chip. In FIG. 3, a rectangle surrounded by a dotted line as a representative shows the circuit of one pixel. At least part of each transistor described below corresponds to one transistor 105 in FIG. 1.

As described above, one unit group 131 includes 16 pixels. Sixteen PDs 104 included in these pixels are connected to corresponding transfer transistors 302. The gates of the transfer transistors 302 are connected to a TX line 307 through which a transfer pulse is supplied. In the present embodiment, the TX line 307 is shared by the 16 transfer transistors 302.

The drain of each transfer transistor 302 is connected to the source of a corresponding reset transistor 303, and so-called floating diffusion FD (charge detection unit) therebetween is connected to the gate of a corresponding amplifier transistor 304. The drains of the reset transistors 303 are connected to a Vdd line 310 through which a power-supply voltage is supplied. The gates of the reset transistors 303 are connected to a reset line 306 through which a reset pulse is supplied. In the present embodiment, the reset line 306 is shared by the 16 reset transistors 303.

The drains of the amplifier transistors 304 are connected to the Vdd line 310, through which a power-supply voltage is supplied. The sources of the amplifier transistors 304 are connected to the drains of corresponding select transistors 305. The gates of the select transistors 305 are connected to corresponding decoder lines 308 through which a selection pulse is supplied. In the present embodiment, the different decoder lines 308 are disposed with respect to the 16 select transistors 305. The sources of the select transistors 305 are connected to a shared output line 309. A load current source 311 supplies a current to the output line 309. That is, the output line 309 with respect to the select transistors 305 is formed by a source follower. The load current source 311 may be disposed in any of the image-capture chip 113 and signal processing chip 111.

Described below is the flow from when the accumulation of charge starts to when pixel signals are outputted after the accumulation ends. Reset pulses are applied to the reset transistors 303 through the reset line 306. Simultaneously, transfer pulses are applied to the transfer transistors 302 through the TX line 307. Thus, the potentials of the PDs 104 and floating diffusion FD are reset.

When the application of the transfer pulses is released, the PDs 104 convert received incident light into charge and accumulate it. Subsequently, when transfer pulses are applied again with reset pulses not being applied, the charge accumulated in each PD 104 is transferred to the corresponding floating diffusion FD. Thus, the potential of the floating diffusion FD is changed from the reset potential to the signal potential after the charge accumulation. When selection pulses are applied to the select transistors 305 through the decoder lines 308, the variation in the signal potential of each floating diffusion FD is transmitted to the output line 309 through the corresponding amplifier transistor 304 and select transistor 305. Based on such a circuit operation, the unit pixels output, to the output line 309, pixel signals corresponding to the reset potentials and pixel signals corresponding to the signal potentials.

As shown in FIG. 3, in the present embodiment, the reset line 306 and TX line 307 are shared by the 16 pixels forming the unit group 131. That is, reset pulses and transfer pulses are simultaneously applied to all the 16 pixels. Accordingly, all the pixels forming the unit group 131 start to accumulate charge at the same timing and end the charge accumulation at the same timing. Note that selection pulses are sequentially applied to the select transistors 305 and therefore pixel signals corresponding to the accumulated charge are selectively outputted to the output line 309. Different reset lines 306, TX lines 307, and output lines 309 are disposed for the respective unit groups 131.

By constructing the circuit on the basis of unit groups 131 as described above, the charge accumulation time can be controlled for each unit group 131. In other words, it is possible to cause the unit groups 131 to output pixel signals based on different charge accumulation times. More specifically, by causing another unit group 131 to accumulate charge several times and to output pixel signals each time while one unit group 131 is caused to accumulate charge once, it is possible to cause the unit groups 131 to output moving image frames at different frame rates.

Figure 4:
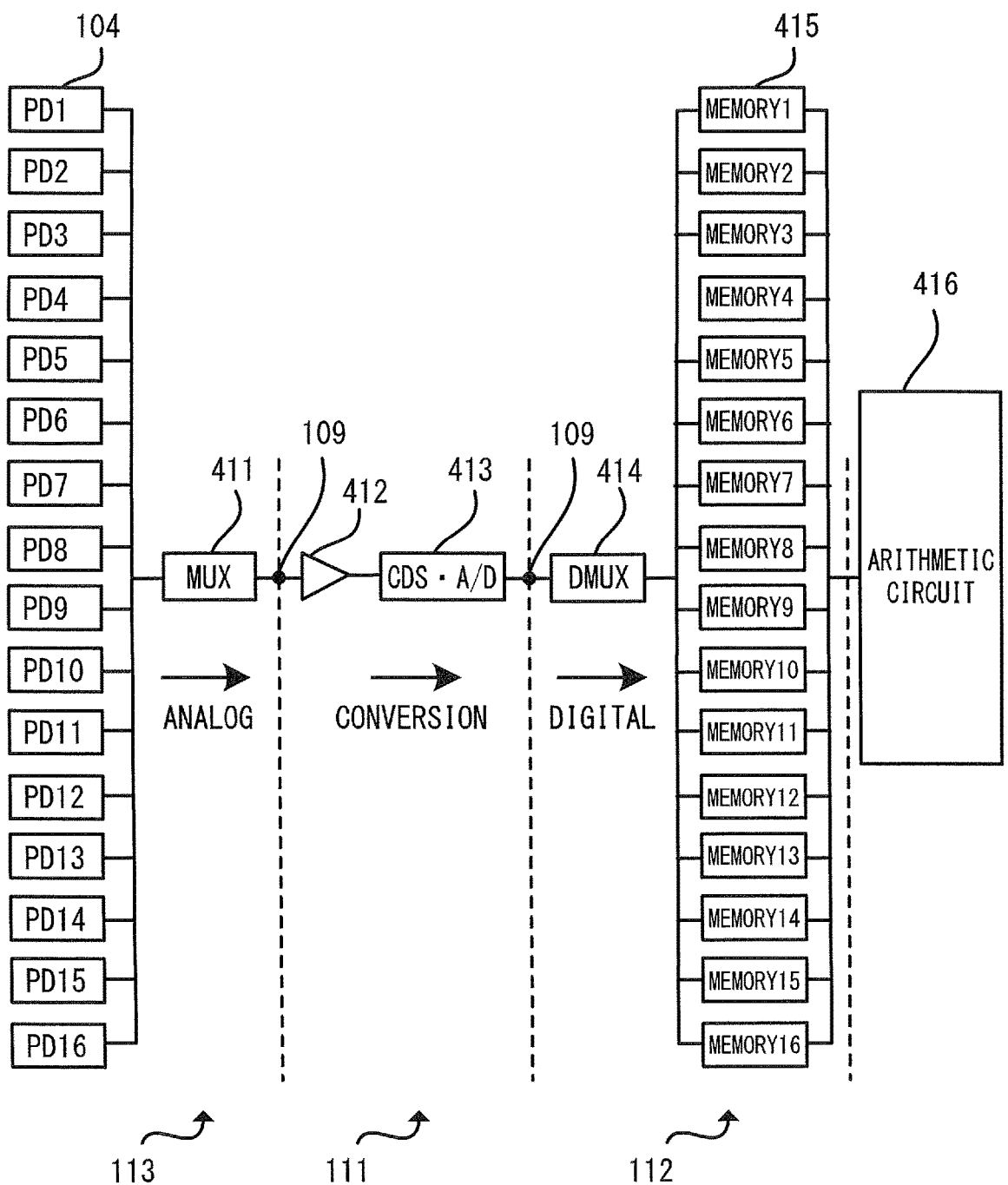
FIG. 4 is a block diagram showing the functional configuration of an image sensor.

FIG. 4 is a block diagram showing the functional configuration of the image sensor. An analog multiplexer 411 sequentially selects 16 PDs 104 forming one unit group 131 and causes each selected PD 104 to output a pixel signal to an output line 309 disposed in a manner corresponding to the unit group 131. The multiplexer 411 is formed along with the PDs 104 in the image-capture chip 113.

The analog pixel signals outputted through the multiplexer 411 are amplified by an amplifier 412 which is formed in the signal processing chip 111. The pixel signals amplified by the amplifier 412 are subjected to correlated double sampling (CDS) and analog-to-digital (A/D) conversion by a signal processing circuit 413 formed in the signal processing chip 111 and configured to perform CDS and A/D conversion. Since the pixel signals are subjected to CDS by the signal processing circuit 413, the noise in the pixel signals is reduced. The A/D-converted pixel signals are passed to a demultiplexer 414 and then stored in corresponding pixel memories 415. The demultiplexer 414 and pixel memories 415 are formed in the memory chip 112.

An arithmetic circuit 416 processes the pixel signals stored in the pixel memories 415 and passes the resulting signals to a subsequent image processing unit. The arithmetic circuit 416 may be disposed in any of the signal processing chip 111 and memory chip 112. While the elements connected to the single unit group 131 are shown in FIG. 4, these elements are disposed for each unit group 131 in practice and operate in parallel. Note that the arithmetic circuit 416 need not necessarily be disposed for each unit group 131. For example, a single arithmetic circuit 416 may sequentially refer to and process the values in the pixel memories 415 corresponding to the respective unit groups 131.

As described above, the output lines 309 are disposed in a manner corresponding to the respective unit groups 131. In the image sensor 100, the image-capture chip 113, signal processing chip 111, and memory chip 112 are stacked. Accordingly, by using, as the output lines 309, the bumps 109 electrically connecting between the chips, the lines can be routed without enlarging the chips in the surface direction.

Next, blocks set in the pixel region 113A (see FIG. 2) of the image sensor 100 will be described. In the present embodiment, the pixel region 113A of the image sensor 100 is divided into multiple blocks. Each block includes at least one unit group 131. Pixels included in the respective blocks are controlled by different control parameters. That is, the control parameter varies between pixel signals acquired from pixels included in one block and pixel signals acquired from pixels included in another block. Examples of a control parameter include the charge accumulation time or frequency, the frame rate, the gain, the thinning-out rate, the number of rows or columns whose pixel signals are summed up, and the digitized bit number. The control parameters may be parameters used in image processing following the acquisition of image signals from the pixels.

As used herein, the charge accumulation time refers to the time from when the PDs 104 start to accumulate charge to when they end the accumulation. The charge accumulation frequency refers to the frequency with which the PDs 104 accumulate charge per unit time. The frame rate refers to the number of frames processed (displayed or recorded) per unit time in a moving image. The frame rate is expressed in frames per second (fps). As the frame rate is increased, a subject moves more smoothly in a moving image.

The gain refers to the gain factor (amplification factor) of the amplifier 412. By changing the gain, the ISO sensitivity can be changed. The ISO sensitivity is a standard for photographic films developed by the ISO and represents the level of the weakest light which a photographic film can record. Typically, the sensitivity of image sensors is represented by the ISO sensitivity. In this case, the ability of the image sensor 100 to capture light is represented by the value of the ISO sensitivity. When the gain is increased, the ISO sensitivity is increased as well. For example, when the gain is doubled, the electrical signal (pixel signal) is doubled as well. Thus, appropriate brightness is obtained even when the amount of incident light is halved. However, the increase in gain amplifies noise included in the electric signal, thereby increasing noise.

The thinning-out rate refers to the ratio of the number of pixels from which pixel signals are not read to the total number of pixels in a predetermined region. For example, a thinning-out rate of a predetermined region of 0 means that pixel signals are read from all pixels in the predetermined region. A thinning-out rate of a predetermined region of 0.5 means that pixel signals are read from half the pixels in the predetermined region. Specifically, where a unit group 131 is a Bayer array, one Bayer array unit from which pixel signals are read and one Bayer array unit from which pixel signals are not read are alternately set in the vertical direction, that is, two pixels (two rows) from which pixel signals are read and two pixels (two rows) from which pixel signals are not read are alternately set in the vertical direction. On the other hand, when the pixels from which pixel signals are read are thinned out, the resolution of images is reduced. However, 20 million or more pixels are arranged in the image sensor 100 and therefore, even when the pixels are thinned out, for example, at a thinning-out rate of 0.5, images can be displayed with 10 million or more pixels. For this reason, the user seems not to worry about such a resolution reduction.

The number of rows whose pixel signals are summed up refers to the number of vertically adjacent pixels whose pixel signals are summed up. The number of columns whose pixel signals are summed up refers to the number of horizontally adjacent pixels whose pixel signals are summed up. Such a summation process is performed, for example, in the arithmetic circuit 416. When the arithmetic circuit 416 sums up pixel signals of a predetermined number of vertically or horizontally adjacent pixels, there is obtained an effect similar to that obtained by thinning out the pixels at a predetermined thinning-out rate and reading pixel signals from the resulting pixels. In the summation process, an average value may be calculated by dividing the sum of the pixel signals by the row number or column number obtained by the arithmetic circuit 416.

The digitized bit number refers to the number of bits of a digital signal converted from an analog signal by the signal processing circuit 413. As the number of bits of a digital signal is increased, luminance, color change, or the like is represented in more detail.

In the present embodiment, the accumulation conditions refer to the conditions on the accumulation of charge in the image sensor 100. Specifically, the accumulation conditions refer to the charge accumulation time or frequency, frame rate, and gain of the control parameters. Since the frame rate can change according to the charge accumulation time or frequency, it is included in the accumulation conditions. Similarly, the correct amount of exposure can change according to the gain, and the charge accumulation time or frequency can change according to the correct amount of exposure. Accordingly, the gain is included in the accumulation conditions.

The image-capture conditions refer to conditions on image-capture of a subject. Specifically, the image-capture conditions refer to control parameters including the accumulation conditions. The image-capture conditions includes control parameters for controlling the image sensor 100 (e.g., the charge accumulation time or frequency, frame rate, gain), as well as control parameters for controlling reading of signals from the image sensor 100 (e.g., thinning-out rate), and control parameters for processing signals from the image sensor 100 (e.g., the number of rows or columns whose pixel signals are summed up, digitized bit number, and control parameters used when an image processing unit 30 (to be discussed later) processes images).

Figure 5:
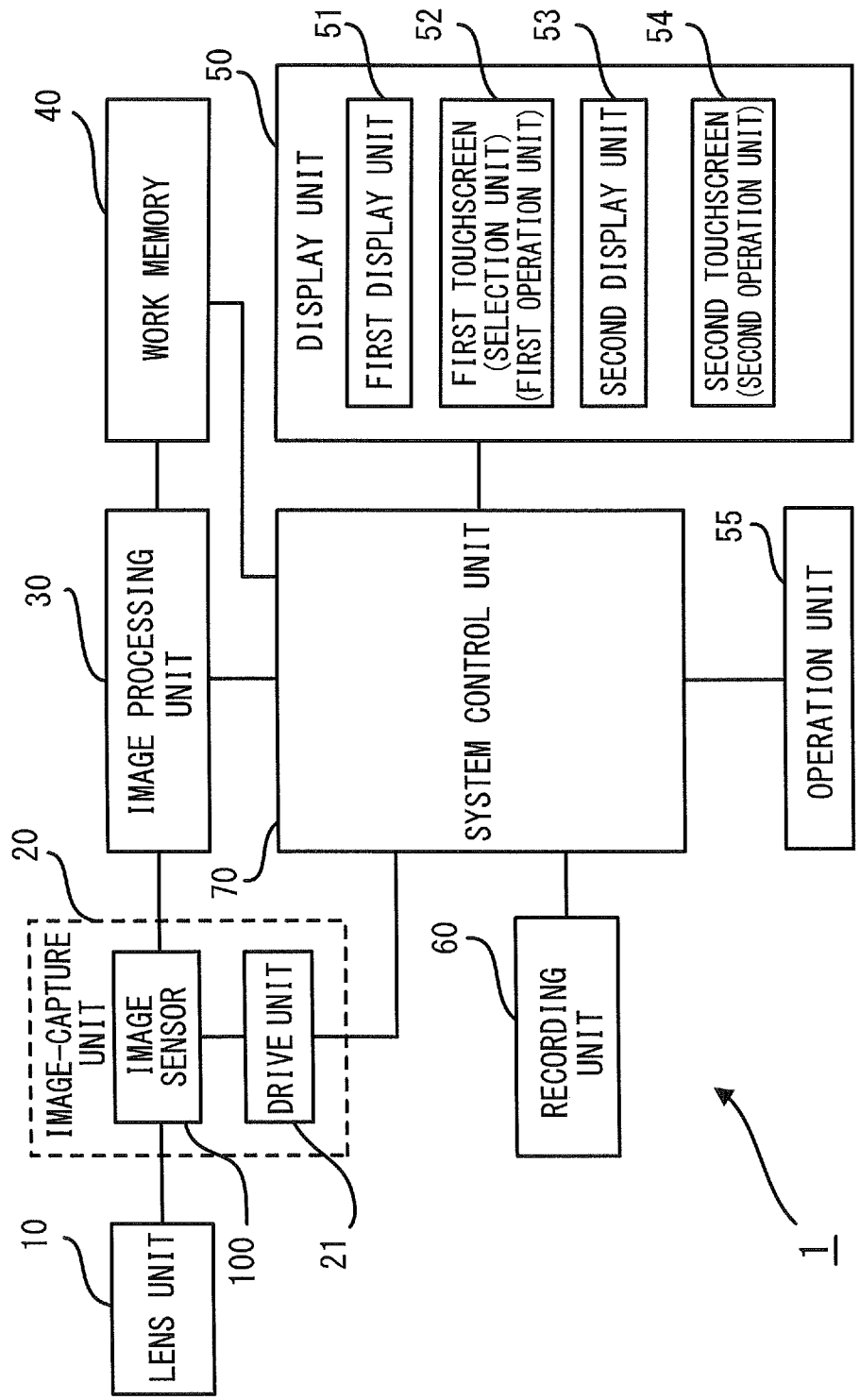
FIG. 5 is a block diagram showing the configuration of an electronic apparatus according to a first embodiment.

FIG. 5 is a block diagram showing the configuration of an electronic apparatus according to the first embodiment. As shown in FIG. 5, an electronic apparatus 1 includes a lens unit 10, an image-capture unit 20, the image processing unit 30, a work memory 40, a display unit 50, an operation unit 55, a recording unit 60, and a system control unit 70. The lens unit 10 is an image-capture optical system including multiple lenses. The lens unit 10 guides a pencil of rays from a subject to the image-capture unit 20. The lens unit 10 may be integral with the electronic apparatus 1 or may be an interchangeable lens which is detachable from the electronic apparatus 1. The lens unit 10 may also include a focus lens or zoom lens.

The image-capture unit 20 includes the image sensor 100 and a drive unit 21. The drive unit 21 is a control circuit configured to control the drive of the image sensor 100 in accordance with an instruction from the system control unit 70. Specifically, the drive unit 21 controls the charge accumulation time or frequency, which is a control parameter, by controlling the timing (or the cycle of the timing) when reset pulses or transfer pulses are applied to the reset transistors 303 or transfer transistors 302, respectively. The drive unit 21 also controls the frame rate by controlling the timing (or the cycle of timing) when reset pulses, transfer pulses, or selection pulses are applied to the reset transistors 303, transfer transistor 302, or select transistors 305, respectively. The drive unit 21 also controls the thinning-out rate by setting pixels to which reset pulses, transfer pulses, and selection pulses are applied.

The drive unit 21 also controls the ISO sensitivity of the image sensor 100 by controlling the gain (also called the gain factor or amplification factor) of the amplifier 412. The drive unit 21 also sets the number of rows or columns whose pixel signals are summed up by transmitting an instruction to the arithmetic circuit 416. The drive unit 21 also sets the digitized bit number by transmitting an instruction to the signal processing circuit 413. The drive unit 21 also sets blocks in the pixel region (image-capture region) 113A of the image sensor 100. As seen above, the drive unit 21 serves as an image sensor control unit that causes the image sensor 100 to capture an image under image-capture conditions which vary among the blocks and then to output pixel signals. The system control unit 70 transmits an instruction about the position, shape, range, or the like of blocks to the drive unit 21.

The image sensor 100 passes pixel signals from the image sensor 100 to the image processing unit 30. The image processing unit 30 generates image data by performing various types of image processing on raw image data including the pixel signals of the pixels using the work memory 40 as work space. The image processing unit 30 includes a CPU which performs various types of image processing. For example, the image processing unit 30 generates RGB image signals by performing color signal processing on signals obtained from the Bayer arrays and then performs white balance adjustment, sharpness adjustment, gamma correction, gradation adjustment, or the like on the RGB image signals. The image processing unit 30 also compresses image data in a predetermined compression format (JPEG format, MPEG format, or the like) if necessary. The image data generated in the image processing unit 30 is recorded in the recording unit 60 through the system control unit 70. The image data generated in the image processing unit 30 is also outputted to the display unit 50 through the system control unit 70 and then displayed on the display unit 50.

In the present embodiment, the image processing unit 30 performs the above processes, as well as combines images into image data based on images captured multiple times continuously. Through these processes, noise is eliminated.

Parameters referred to when the image processing unit 30 processes images are also included the control parameters (image-capture conditions). For example, parameters such as color signal processing, white balance adjustment, gradation adjustment, and compression rate are included in the control parameters. Signals read from the image sensor 100 change according to the charge accumulation time or the like, and the parameters referred to in image processing also change according to the changes in the signals. The image processing unit 30 sets different control parameters for the respective blocks and performs image processing such as color signal processing on the basis of these control parameters.

The image processing unit 30 also extracts or discards, at predetermined timings, frames from multiple frames chronologically obtained from the image-capture unit 20. Thus, it is possible to reduce the amount of data to reduce the load on subsequent processes. The image processing unit 30 also calculates one or more frames to be interpolated between multiple frames chronologically obtained from the image-capture unit 20 and then interpolates the calculated one or more frames between the multiple frames. Thus, it is possible to play back moving images in such a manner that the images move more smoothly. While the drive unit 21 is configured to control the thinning-out rate, this configuration need not necessarily be employed. For example, the image processing unit 30 or arithmetic circuit 416 may control the thinning-out rate by discarding predetermined pixel signals of pixel signals read from all the pixels by the drive unit 21.

The work memory 40 temporarily stores image data or the like when the image processing unit 30 processes images. The display unit 50 includes, for example, a liquid crystal display panel. As shown in FIG. 5, the display unit 50 includes a first display unit 51, a first touchscreen (selection unit, first operation unit) 52, a second display unit 53, and a second touchscreen (second operation unit) 54.

The first display unit 51 display images (still images, moving images, live view images) captured by the image-capture unit 20 or various types of information. The first touchscreen 52 is formed on the display screen of the first display unit 51. When the user touches the first touchscreen 52 to specify a region, the first touchscreen 52 outputs a signal indicating the touched position to the system control unit 70. The second display unit 53 displays menus on which the user sets image-capture conditions (control parameters). The second touchscreen 54 is formed on the display screen of the second display unit 53. When the user touches the second touchscreen 54 to set image-capture conditions, the second touchscreen 54 outputs a signal indicating the touched position to the system control unit 70.

The operation unit 55 includes a shutter button, a recording start button, various operation switches, and the like operated by the user. The operation unit 55 outputs a signal corresponding to an operation performed by the user to the system control unit 70. The recording unit 60 has a card slot into which a storage medium such as a memory card can be inserted. The recording unit 60 stores, in a storage medium inserted in the card slot, image data generated by the image processing unit 30 or various types of data. The recording unit 60 includes an internal memory. The recording unit 60 may be configured to record, in the internal memory, image data generated by the image processing unit 30 or various types of data.

The system control unit 70 controls the entire processing and operation of the electronic apparatus 1. The system control unit 70 includes a central processing unit (CPU). In the present embodiment, the system control unit 70 divides the image-capture surface (pixel region 113A) of the image sensor 100 (image-capture chip 113) into multiple blocks and causes the image sensor 100 to capture an image at charge accumulation times (or charge accumulation frequencies), frame rates, and gains which vary among the blocks. To this end, the system control unit 70 transmits the positions, shapes, and ranges of the blocks and accumulation conditions for the blocks to the drive unit 21. The system control unit 70 also causes the image sensor 100 to capture an image at different thinning-out rates, the different numbers of rows or columns whose pixel signals are summed up, and different digitized bit numbers which vary among the blocks. To this end, the system control unit 70 transmits image-capture conditions for the blocks (thinning-out rates, the numbers of rows or columns whose pixel signals are summed up, and digitized bit numbers) to the drive unit 21. The image processing unit 30 processes the image under image-capture conditions (control parameters such as color signal processing, white balance adjustment, gradation adjustment, and compression rate) which vary among the blocks. To this end, the system control unit 70 transmits image-capture conditions for the respective blocks (control parameters such as color signal processing, white balance adjustment, gradation adjustment, and compression rate) to the image processing unit 30.

The system control unit 70 also causes the recording unit 60 to store the image data generated by the image processing unit 30. The system control unit 70 also causes the first display unit 51 of the display unit 50 to display the image by outputting the image data generated by the image processing unit 30 to the display unit 50 or by reading image data stored in the recording unit 60 and outputting it to the display unit 50. The image displayed on the first display unit 51 includes a still image, moving image, and live view image. As used herein, the live view image refers to an image displayed on the first display unit 51 by sequentially outputting image data generated by the image processing unit 30 to the display unit 50. The user uses the live view image in order to check the image of the subject the image-capture unit 20 is capturing. A live view image is also called a through image or preview image.

The image processing unit 30 is implemented when the CPU performs processing on the basis of a control program. The system control unit 70 is also implemented when the CPU performs processing on the basis of the control program.

Figure 6:
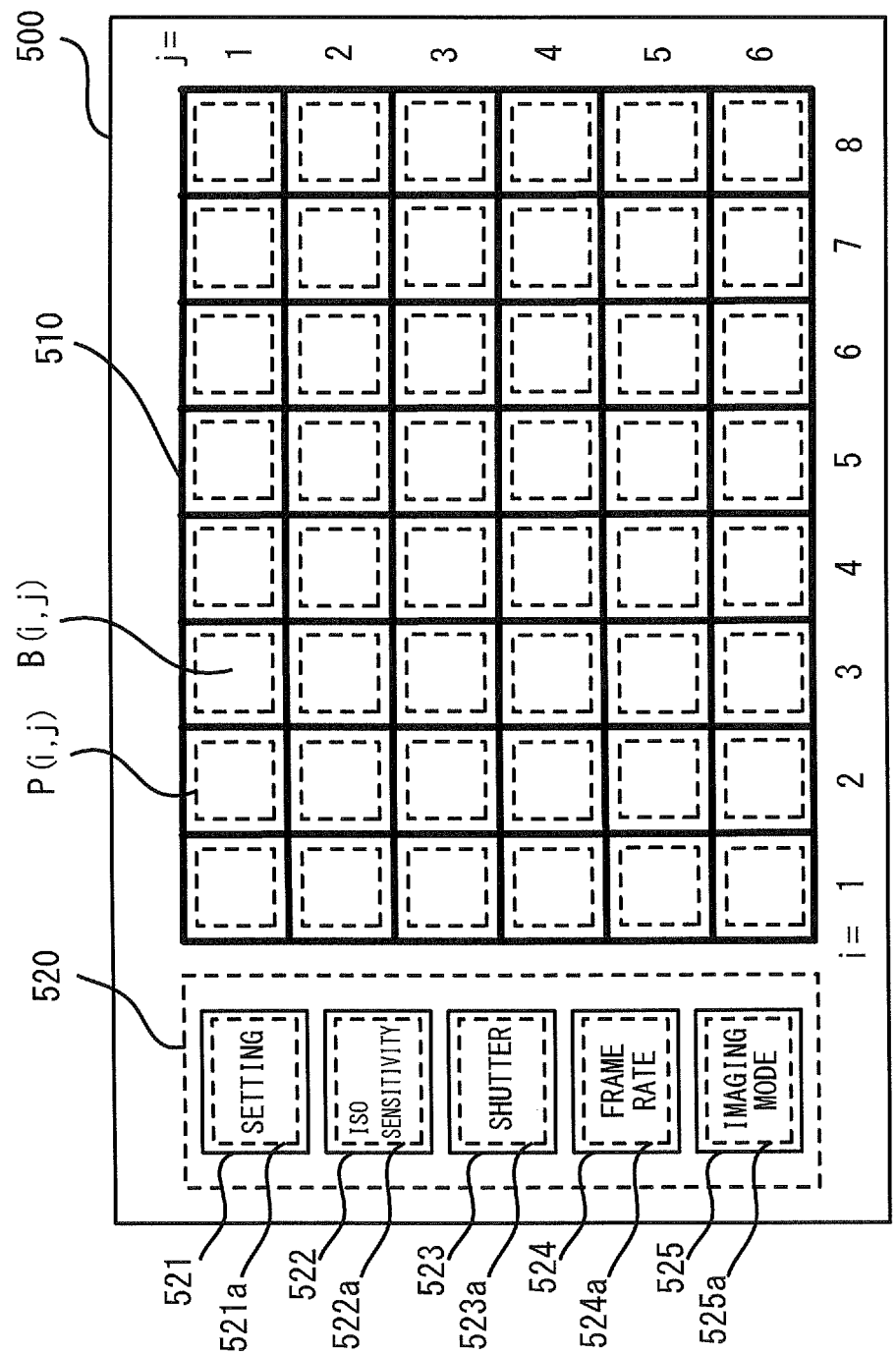
FIG. 6 is a diagram showing an example of the display screen of a display unit.

FIG. 6 is a diagram showing an example of the display screen of the display unit. As shown in FIG. 6, a display screen 500 of the display unit 50 includes an image display region 510 and an operation button display region 520. The image display region 510 is a region for displaying an image captured by the image-capture unit 20, that is, a still image, moving image, or live view image. The operation button display region 520 is a region for displaying menus on which the user sets image-capture conditions or the like. In the present embodiment, the image display region 510 and operation button display region 520 are disposed in the single display screen 500. The image display region 510 corresponds to the first display unit 51, and the operation button display region 520 corresponds to the second display unit 53.

In an example shown in FIG. 6, multiple blocks B(i,j) are set in the image display region 510. More specifically, in the image display region 510, 8 blocks B(i,j) where i=1 to 8 are set horizontally (in the lateral direction of FIG. 6), and 6 blocks B(i,j) where j=1 to 6 are set vertically (in the longitudinal direction of FIG. 6). That is, the image display region 510 is divided into 8×6 (=48) blocks. Further, the first touchscreen 52 is disposed on the image display region 510. Multiple touch regions P(i,j) of the first touchscreen 52 overlap the multiple blocks B(i,j), respectively. When the user presses (touches) any touch region P(i,j), the corresponding touch region P(i,j) detects that the touch region P(i,j) has been pressed and then outputs a detection signal indicating the pressed position (the pressed touch region) to the system control unit 70.

The operation button display region 520 is disposed near the image display region 510. Menus (menu images) for the user to set a region, image-capture conditions, and the imaging mode are displayed on the operation button display region 520. A setting button 521 is a menu for the user to set a region. An ISO sensitivity button 522 (also referred to as a menu related to the gain), a shutter speed button 523 (also referred to as a menu related to the charge accumulation time), and a frame rate button 524 (also referred to as a menu related to the frame rate) are each a menu for the user to set an image-capture condition. An imaging mode button 525 is a menu for the user to set the imaging mode. Hereafter, the setting button 521, ISO sensitivity button 522, shutter speed button 523, frame rate button 524, and imaging mode button 525 will be simply referred to as the "setting 521," "ISO sensitivity 522," "shutter 523," "frame rate 524," and "imaging mode 525," respectively.

More specifically, the setting 521 is a button for the user to press to set (select) a region in the image display region 510 in units of blocks. The ISO sensitivity 522 is a button for the user to press to set the ISO sensitivity (that is, gain). The shutter 523 is a button for the user to press to set the shutter speed (that is, exposure time). The shutter speed corresponds to the charge accumulation time. The frame rate 524 is a button for the user to press to set the frame rate of moving images or live view images. The imaging mode 525 is a button for the user to make a selection as to whether to set image-capture conditions manually or automatically.

The second touchscreen 54 is disposed on the operation button display region 520. A touch region 521a of the second touchscreen 54 is formed so as to overlap the setting 521. A touch region 522a is formed so as to overlap the ISO sensitivity 522. A touch region 523a is formed so as to overlap the shutter 523. A touch region 524a is formed so as to overlap the frame rate 524. A touch region 525a is formed so as to overlap the imaging mode 525. When the user presses any of the touch regions 521a to 525a, the corresponding touch region detects that the touch region has been pressed (touched) and then outputs a detection signal indicating the pressed position (the pressed touch region) to the system control unit 70. In the present embodiment, the first touchscreen 52 and second touchscreen 54 may be any of separate touchscreens and one touchscreen. If these touchscreens are one touchscreen, the touch regions P(i,j) of the one touchscreen correspond to the first touchscreen 52, and the touch regions 521a to 525a thereof correspond to the second touchscreen 54.

Figure 7:
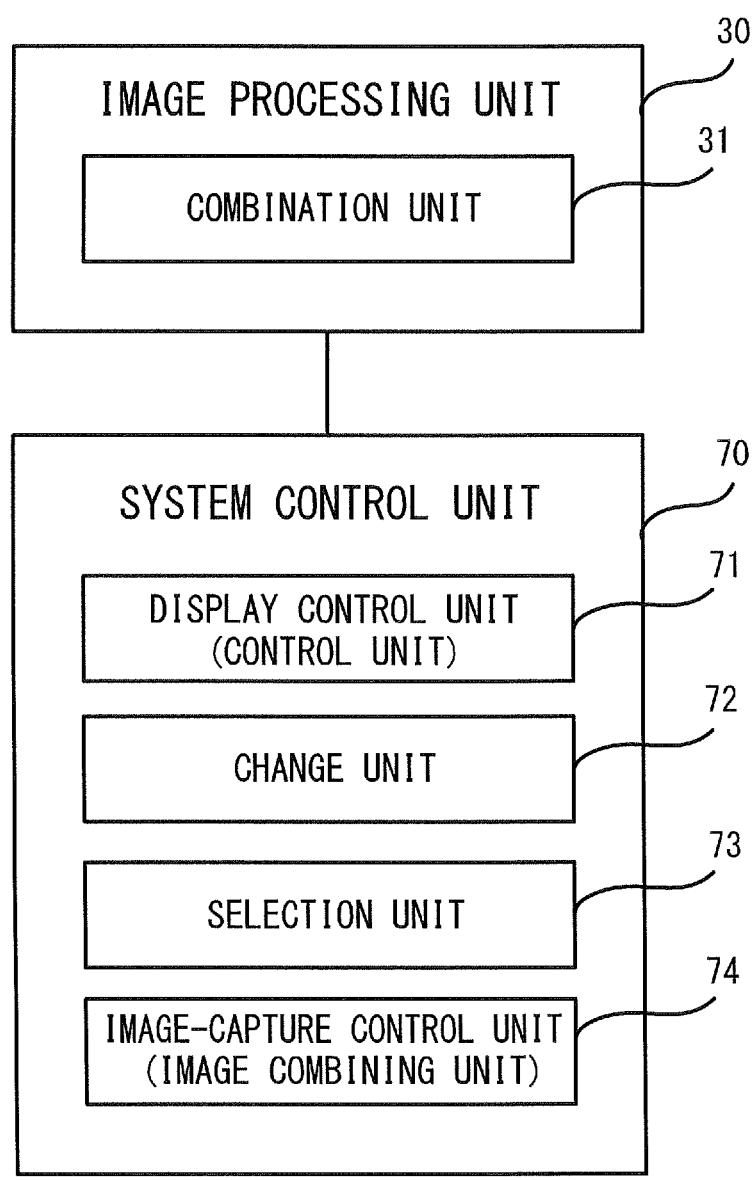
FIG. 7 is a function block diagram of an image processing unit and system control unit according to the first embodiment.

FIG. 7 is a function block diagram of the image processing unit and system control unit according to the first embodiment. As shown in FIG. 7, the image processing unit 30 includes a combination unit 31. The combination unit 31 combines images captured at high speed multiple times. Through this process, noise included in the images is reduced. That is, this process has a noise reduction function.

The system control unit 70 includes a display control unit (control unit) 71, a change unit 72, a selection unit 73, and an image-capture control unit (image combining unit) 74. The display control unit 71 causes the first display unit 51 to display an image (still image, moving image, live view image) by outputting image data to the display unit 50. The display control unit 71 also causes the second display unit 53 to display a preset menu image. The change unit 72 changes image-capture conditions (including accumulation conditions) in response to a touch on the second touchscreen 54 by the user, or automatically. The selection unit 73 selects a region in the image display region 510 in units of blocks in response to a touch on the first touchscreen 52 by the user. The image-capture control unit 74 controls an image capture in response to an operation of a shatter button (operation unit 55) by the user.

In the embodiments (the first embodiment and second and third embodiments to be discussed later), a "first region" refers to a region in the pixel region 113A of the image sensor 100 corresponding to a region in the image display region 510 of the display screen 500 selected by the selection unit 73 in response to a user operation or automatically. A "second region" also refers to a region in the pixel region 113A of the image sensor 100 corresponding to a region in the image display region 510 of the display screen 500 selected by the selection unit 73 in response to a user operation or automatically. The first and second regions may be one and the other of two separate regions or may be one and another of three or more separate regions.

Figure 8:
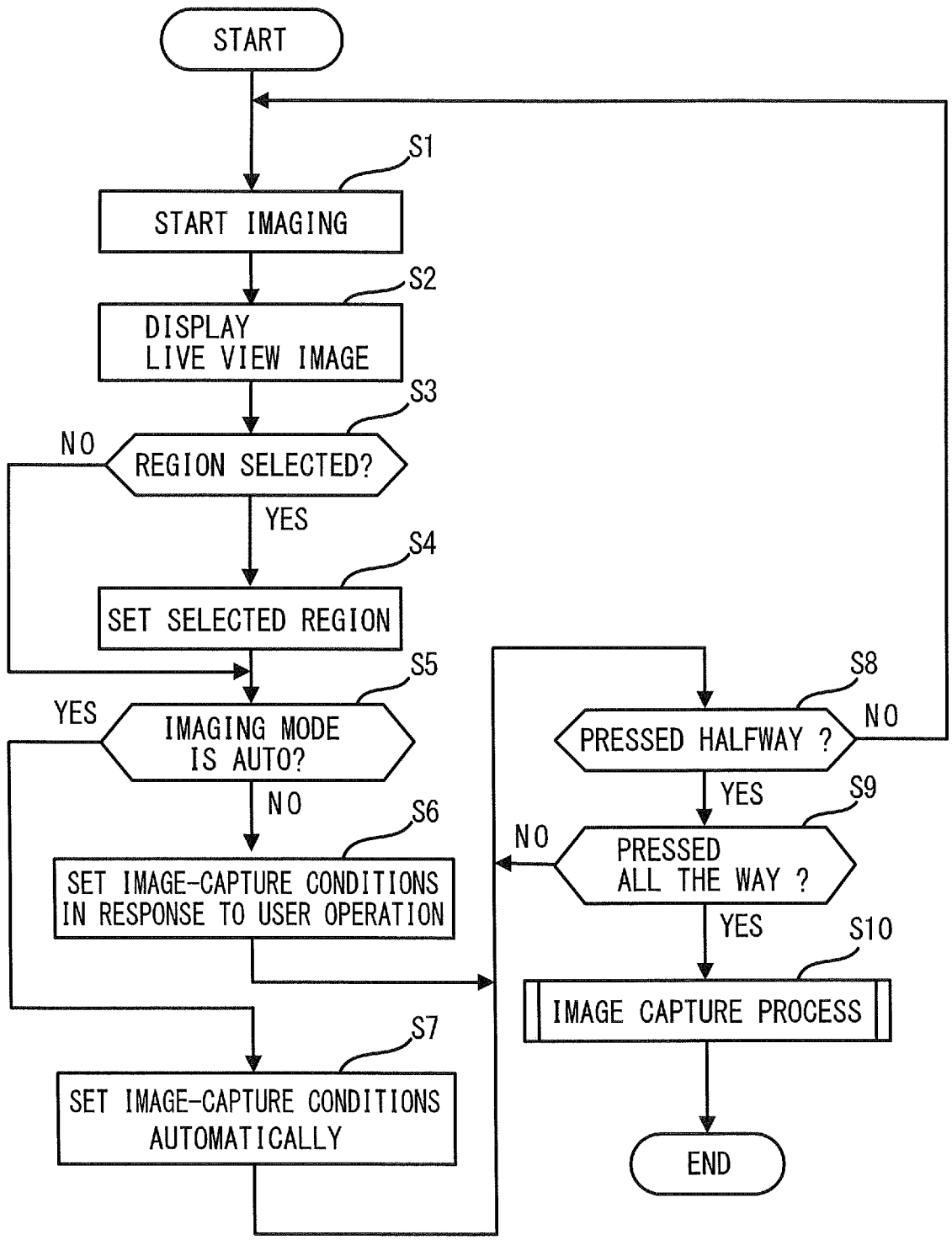
FIG. 8 is a flowchart showing an imaging operation performed by the system control unit according to the first embodiment performs.
Figure 9:
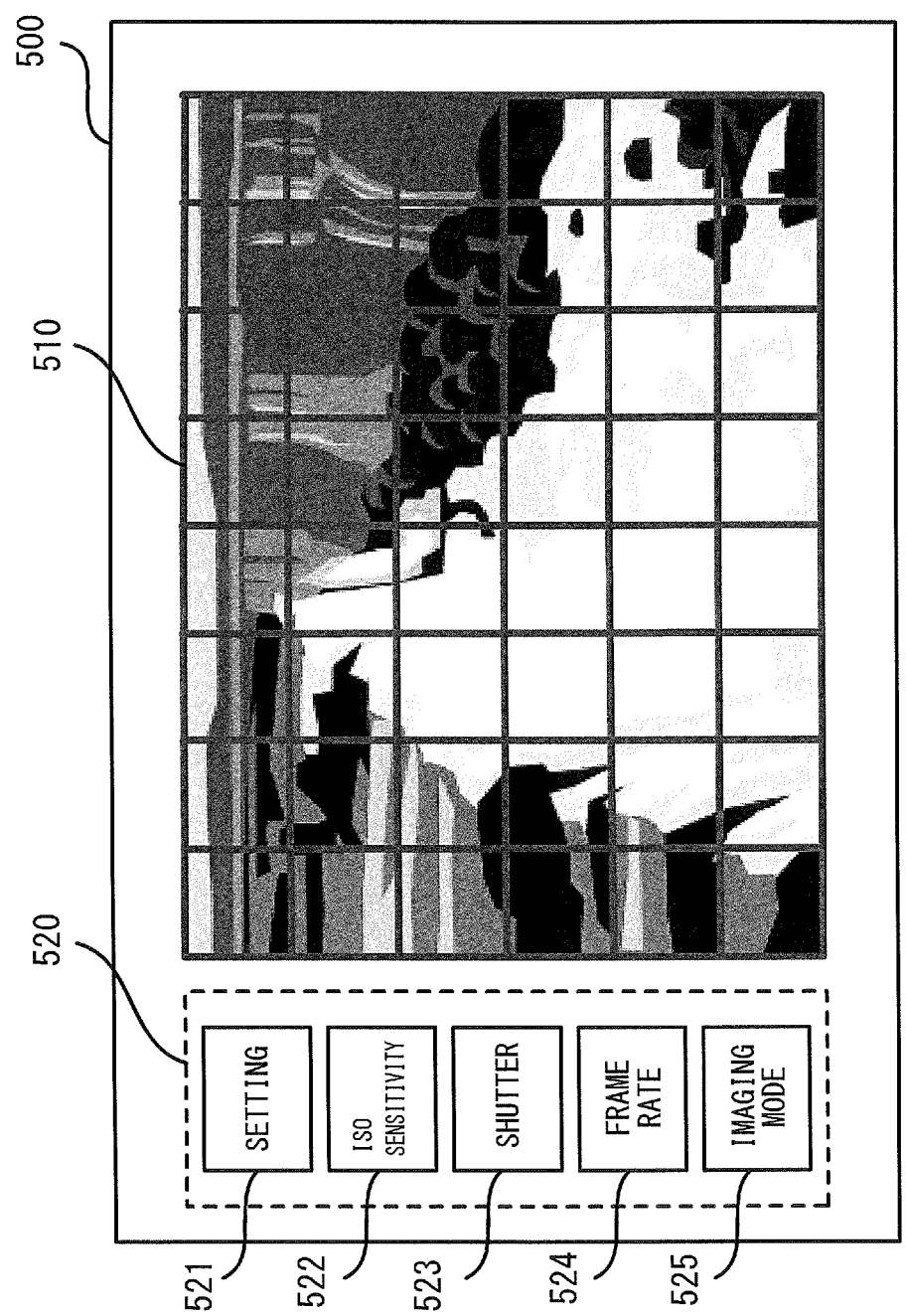
FIG. 9 is a drawing showing an example display of the display screen where a few number of blocks are set in the image display region.
Figure 10:
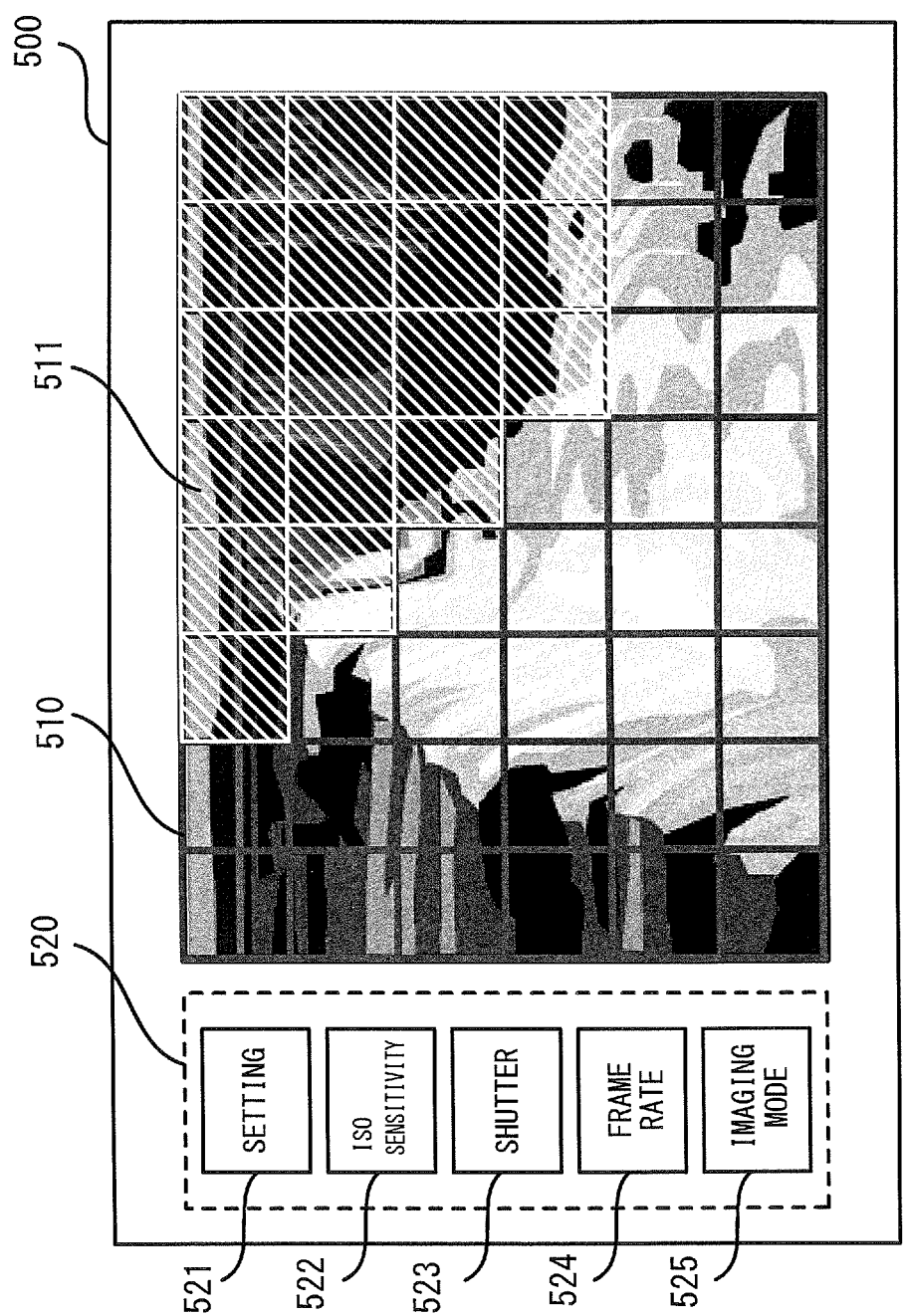
FIG. 10 is a drawing showing an example display of the display screen where a few number of blocks are set in the image display region.

Next, an imaging operation according to the first embodiment will be described. FIG. 8 is a flowchart showing an imaging operation performed by the system control unit according to the first embodiment. FIGS. 9 to 12 are diagrams each showing an example display of the display screen where a few number of blocks are set in the image display region.

In a process shown in FIG. 8, the user powers on the electronic apparatus 1 and then operates the operation unit or the like to start to perform imaging and thus the system control unit 70 starts an imaging operation (step S1). Note that the user previously makes a selection as to whether to capture still images or moving images.

Upon start of imaging, the display control unit 71 displays a live view image captured by the image-capture unit 20 on the first display unit 51 (image display region 510) (step S2). In an example shown in FIG. 9, a live view image including a waterfall is displayed on the image display region 510. In selecting a region in the image display region 510, the user touches the setting 521 (i.e., touch region 521a). Thus, the regions in the image display region 510 are allowed to be selected, that is, the first touchscreen 52 is allowed to detect a touch. The user then selects a region in the image display region 510 in units of blocks by touching, with a finger, (or sliding a finger on) the corresponding ones of the blocks B(i,j) set in the image display region 510. The first touchscreen 52 then outputs, to the system control unit 70, a detection signal corresponding to the touch region P(i,j) touched by the user.

The selection unit 73 then identifies the region selected by the user on the basis of the detection signal from the first touchscreen 52. In an example shown in FIG. 10, a region 511 is selected by the user. The region 511 is a region behind the waterfall (a region hatched with white lines in FIG. 10). Specifically, the region 511 includes blocks B(3,1) to B(8,1), B(4,2) to B(8,2), B(5,3) to B(8,3), and B(6,4) to B(8,4).

The selection unit 73 determines whether the user has selected the region (step S3). If so, the selection unit 73 sets the region 511 selected by the user (step S4). Specifically, the selection unit 73 outputs, to the drive unit 21, a signal indicating the positions or the like of the blocks selected by the user.

The change unit 72 then determines whether the user has selected auto mode as the imaging mode (step S5). In setting the imaging mode, the user touches the imaging mode 525 (i.e., touch region 525a) and then selects manual mode or auto mode from the imaging modes. If the change unit 72 determines that auto mode has not been selected as the imaging mode, that is, determines that manual mode has been selected as the imaging mode, it sets image-capture conditions (including accumulation conditions) in response to operations on the second touchscreen 54 by the user (step S6).

Figure 11:
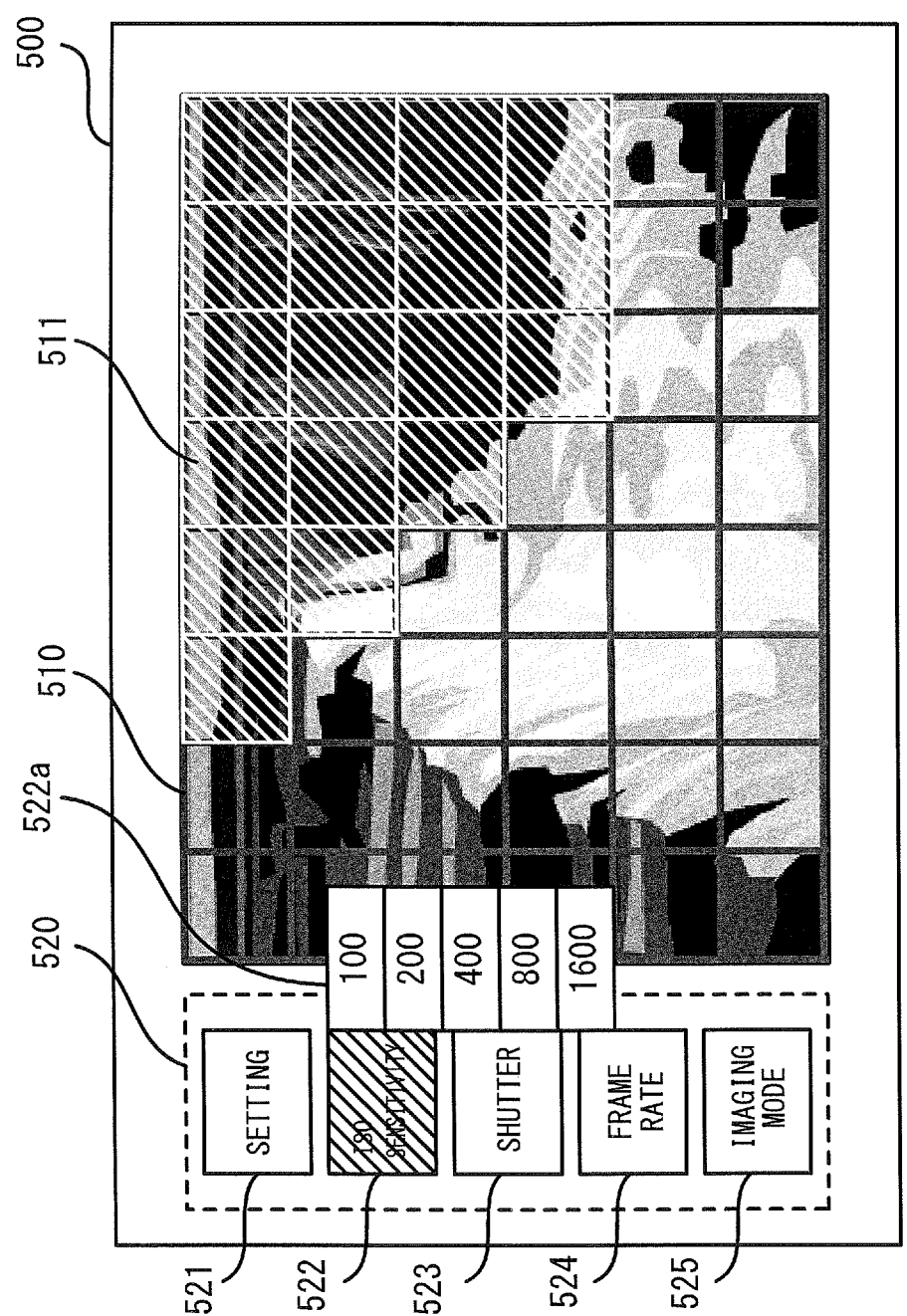
FIG. 11 is a drawing showing an example display of the display screen where a few number of blocks are set in the image display region.

For example, if the user wishes to set the ISO sensitivity as an image-capture condition, he or she touches the ISO sensitivity 522 (i.e., touch region 522a). The second touchscreen 54 then outputs, to the system control unit 70, a detection signal corresponding to the touch region 522a touched by the user. As shown in FIG. 11, the display control unit 71 displays multiple ISO sensitivity values on a side of the ISO sensitivity 522. In an example shown in FIG. 11, "100," "200," "400," "800," and "1600" are displayed as ISO sensitivity values. The change unit 71 also sets new touch regions on the second touchscreen 54 in such a manner that the new touch regions overlap the regions of the ISO sensitivity values. The user then touches one of the ISO sensitivity values. The second touchscreen 54 then outputs, to the system control unit 70, a detection signal corresponding to the touch region touched by the user. The change unit 72 sets the ISO sensitivity value touched by the user. Specifically, the change unit 72 outputs, to the drive unit 21, a signal indicating a gain corresponding to the ISO sensitivity value selected by the user.

If the user wishes to set the shutter speed (charge accumulation time) or frame rate, he or she performs an operation similar to setting of the ISO sensitivity. That is, if the user wishes to set the shutter speed or frame rate as an image-capture condition, he or she touches the shutter 523 (i.e., touch region 523a) or frame rate 524 (i.e., touch region 524a). The second touchscreen 54 then outputs, to the system control unit 70, a detection signal corresponding to the touch region 523a or 524a touched by the user. The display control unit 71 then displays multiple shutter speed values or frame rate values on a side of the shutter 523 or frame rate 524. The user then touches one of the shutter speed values or frame rate values. The change unit 72 then sets the shutter speed value or frame rate value touched by the user. Specifically, the change unit 72 outputs, to the drive unit 21, a signal indicating the shutter speed or frame rate selected by the user.

The drive unit 21 receives a signal indicating, in units of blocks, a region in the pixel region 113A corresponding to the region 511 selected by the user. The drive unit 21 also receives signals indicating the image-capture conditions selected by the user. In response to these signals, the drive unit 21 drives the image-capture unit 20 in such a manner that a region in the pixel region 113A corresponding to the region 511 is imaged under the indicated image-capture conditions (shutter speed, ISO sensitivity, frame rate). Typically, where still images are captured, the shutter speed is set; where moving images are captured, the frame rate is set.

When the drive unit 21 changes the image-capture conditions of the region in the pixel region 113A corresponding to the region 511 as described above, changes are made to an image portion (live view image portion) displayed on the region 511 in the image display region 510. For example, if the ISO sensitivity is increased, an image portion corresponding to a subject is captured brightly even with a small amount of light. Further, dark portions of the live view image are brightened. If the shutter speed is increased, blurring of a moving subject is reduced. If the frame rate is increased, a subject moves smoothly in moving images.

As seen above, if the user selects a region and sets image-capture conditions of the selected region, he or she can check changes made to an image position (live view image portion) corresponding to the selected region in accordance with the changes in the image conditions. In this case, the image conditions selected by the user may not be conditions matching appropriate exposure. However, the user can understand that the changes in the image-capture conditions have caused overexposure or underexposure. Further, the user can understand how the image changes due to changes in any image-capture condition. Accordingly, the user can capture an image after changing the image-capture conditions and checking the resulting image.

The steps S1 to S6 described above are repeated until the user presses the shutter (the recording start button if moving images are captured) of the operation unit 55 halfway (step S8). In an example shown in FIG. 12, a region 512 other than the region 511 in the image display region 510 is selected. A live view image portion displayed in the region 512 in the image display region 510 changes according to selections of the values of the ISO sensitivity 522, shutter 523, and frame rate 524 by the user.

Figure 12:
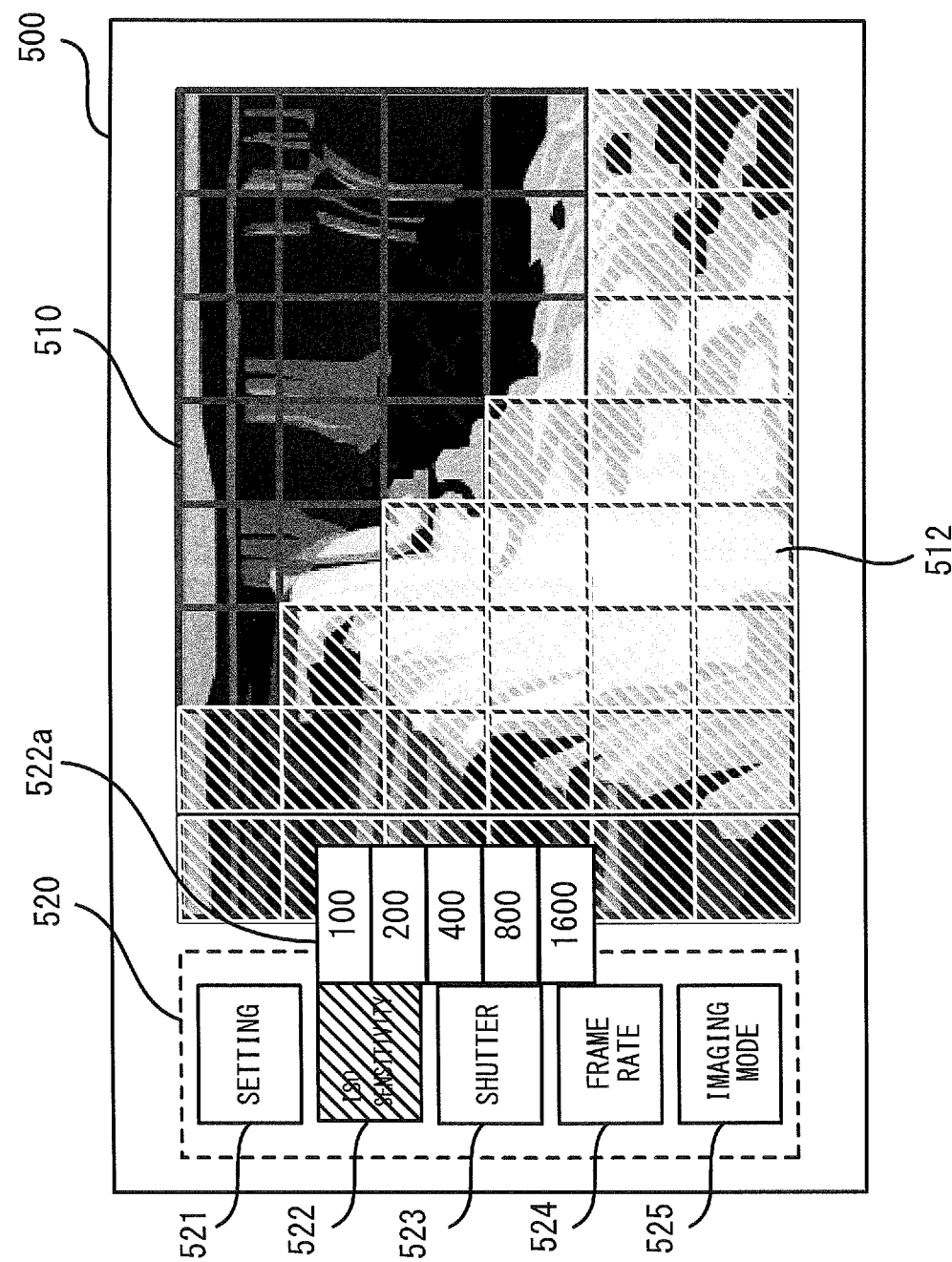
FIG. 12 is a drawing showing an example display of the display screen where a few number of blocks are set in the image display region.

The region 512 shown in FIG. 12 is a region including the waterfall (a region hatched with white lines in FIG. 12). Specifically, the region 512 includes blocks B(1,1) to B(2,1), B(1,2) to B(3,2), B(1,3) to B(4,3), B(1,4) to B(5,4), B(1,5) to B(8,5), and B(1,6) to B(8,6).

If the change unit 72 determines that auto mode has been selected as the imaging mode (YES in step S5), it automatically sets the image-capture conditions of the region 511 selected by the user (step S7). At this time, the change unit 72 changes the image-capture conditions on the basis of at least one of the contrast and color change of the live view image portion in the region 511. For example, the change unit 72 changes the image-capture conditions (ISO sensitivity, shutter speed, frame rate) so that the contrast between the bright part and dark part of the image portion in the region 511 is maximized. Alternatively, the change unit 72 changes the image-capture conditions (ISO sensitivity, shutter speed, frame rate) so that the color change of the image portion in the region 511 becomes most vivid. Alternatively, the change unit 72 changes the image-capture conditions so that the contrast of the image portion in the region 511 is maximized and the color change of the live view image portion in the region 511 becomes most vivid.

The steps when auto mode is selected as the image mode (steps S1 to S5 and S7) are repeated until the user presses the shutter of the operation unit 55 halfway (step S8). For the region 512 also, the change unit 72 automatically changes the image-capture conditions on the basis of at least one of the contrast and color change of the image portion therein (step S7). The live view image portions displayed in the regions 511, 512 in the image display region 510 change according to changes in the ISO sensitivity value, shutter speed value, and frame rate value made by the change unit 72.

Although not shown in FIGS. 9 to 12, the image-capture conditions which can be set for each region by the user are not limited to the ISO sensitivity, shutter speed, and frame rate. For example, there may be employed a configuration where the thinning-out rate, the number of rows or columns whose pixel signals are summed up, the digitized bit number, and the like can also be set as image-capture conditions for each region. There may also be employed a configuration where parameters such as color signal processing, white balance adjustment, gradation adjustment, and compression rate can also be set as image-capture conditions for each region.

The system control unit 70 then determines whether the shutter or recording start button has been pressed halfway (SW1 operation) (step S8). A halfway press is used as an instruction for causing the system control unit 70 to start preparation for capturing an image. Although not shown in FIG. 8, the system control unit 70 also performs, for example, control of auto focus (AF), which adjusts focus automatically.

Figure 13:
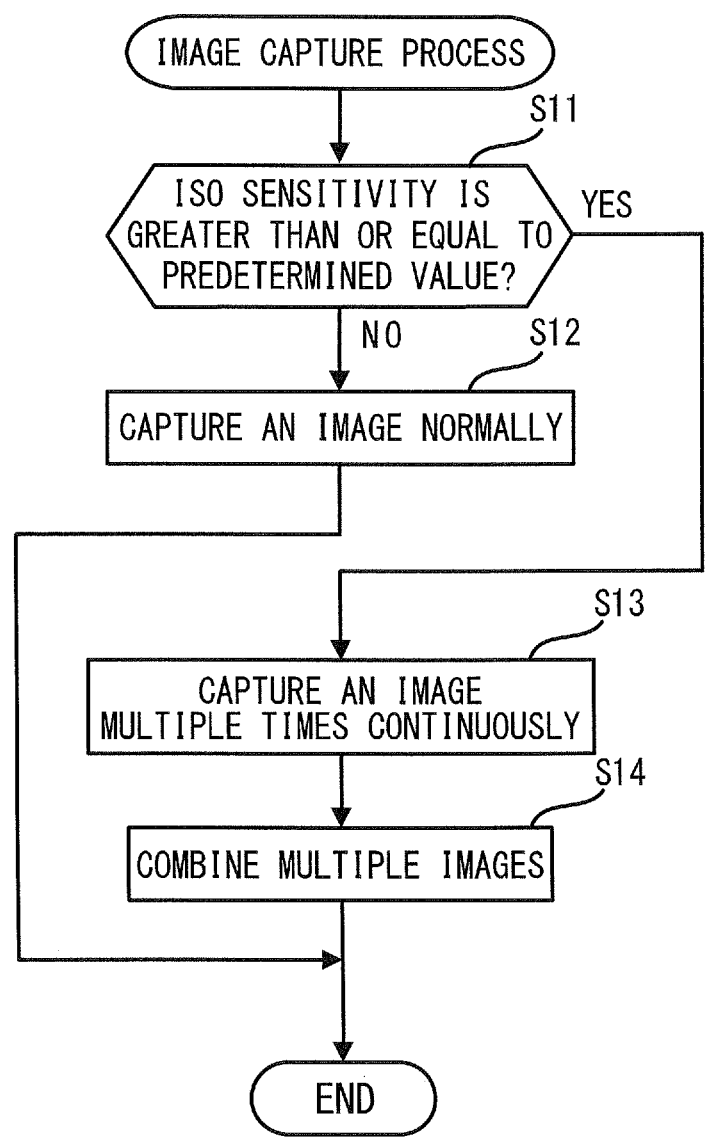
FIG. 13 is a flowchart showing an example of an image capture process according to the first embodiment.

The system control unit 70 then determines whether the shutter or recording start button has been pressed all the way (SW2 operation) (step S9). If so, the image-capture control unit 74 causes the image sensor 100 to capture an image (step S10). FIG. 13 is a flowchart showing an example of an image capture process according to the first embodiment. First, the image-capture control unit 74 determines whether the ISO sensitivity is set to a value greater than or equal to a predetermined value by the user or automatically (step S11). If not so, the image-capture control unit 74 causes the image-capture unit 20 to capture an image normally (step S12). That is, the image-capture unit 20 acquires a still image by capturing an image once as usual. At this time, the image capture is performed under the image-capture conditions selected for each region as described above.

If the image-capture control unit 74 determines that the ISO sensitivity is set to a value greater than or equal to the predetermined value, it causes the image-capture unit 20 to capture an image multiple times continuously (step S13). For example, the image-capture control unit 74 causes the image-capture unit 20 to capture an image five times at high speed by outputting an instruction signal to the drive unit 21. Also in this case, the images are captured under the image-capture conditions selected for each region as described above. For example, multiple image captures are performed during the already set shutter speed time.

The image-capture control unit 74 then instructs the image processing unit 30 to combine multiple images obtained by multiple image captures (step S14). In the image processing unit 30, the combination unit 31 combines the multiple images into a still image on the basis of the instruction from the image-capture control unit 74. While increasing the ISO sensitivity makes noise more likely to occur, combining multiple images captured at high speed as described above reduces noise.

Where moving images are acquired in the image capture process of step S10, the image-capture control unit 74 captures images normally without performing step S11 of FIG. 13 (step S12). That is, where moving images are acquired, continuous multiple image captures in step S13 or combination of multiple images in step S14 is not performed.

Figure 14:
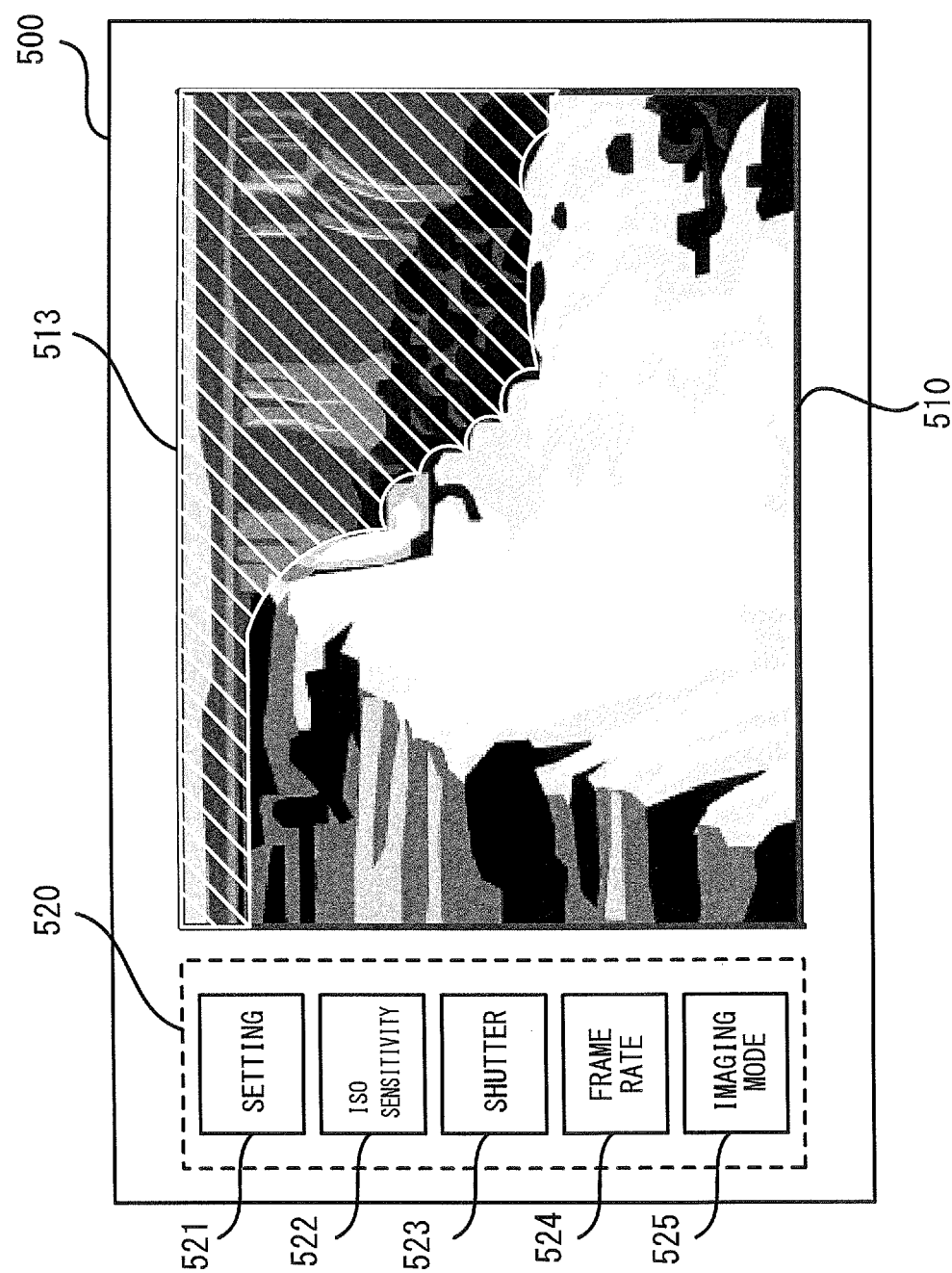
FIG. 14 is a drawing showing an example display of the display screen where a large number of blocks are set in the image display region.
Figure 15:
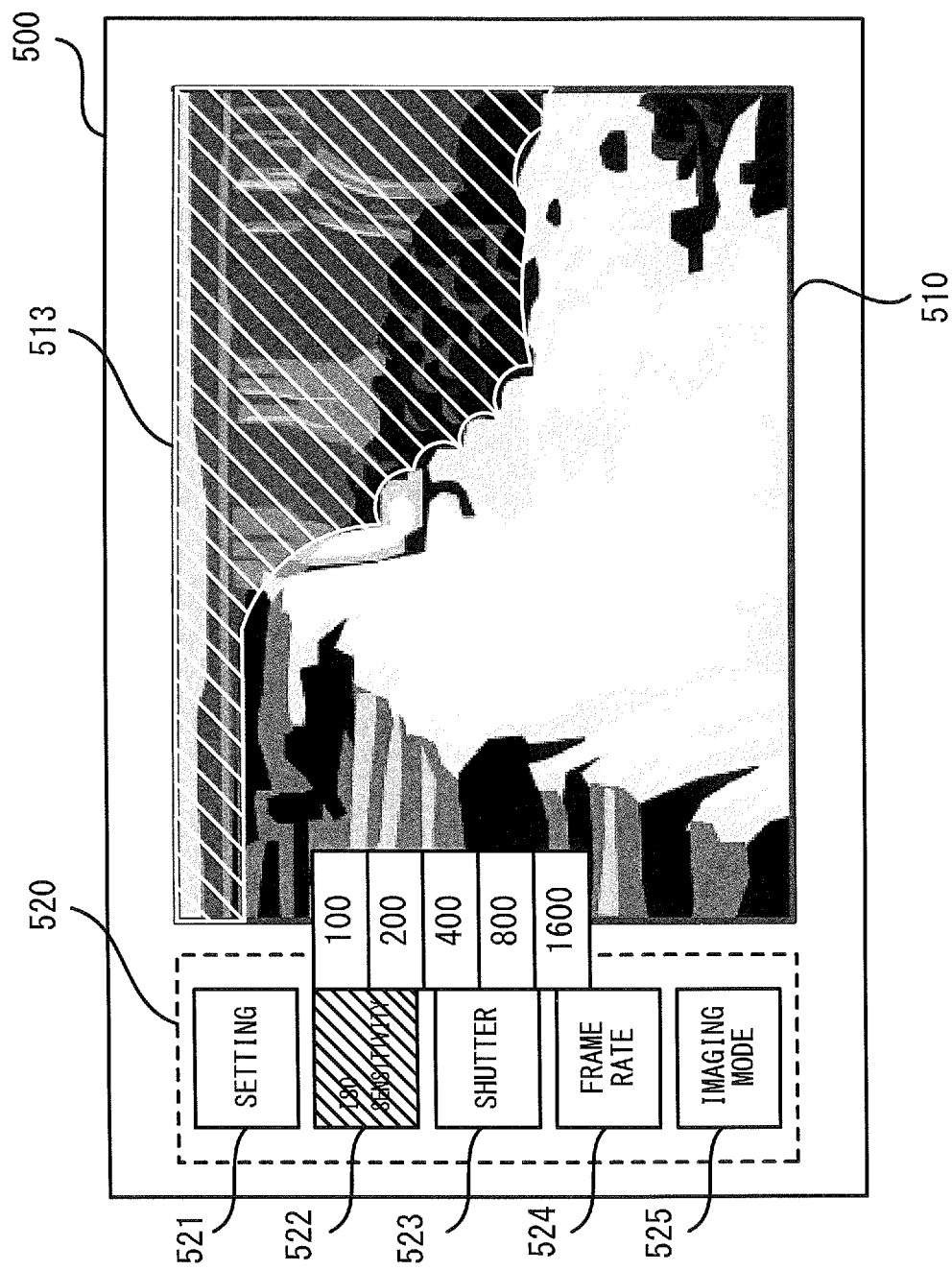
FIG. 15 is a drawing showing an example display of the display screen where a large number of blocks are set in the image display region.
Figure 16:
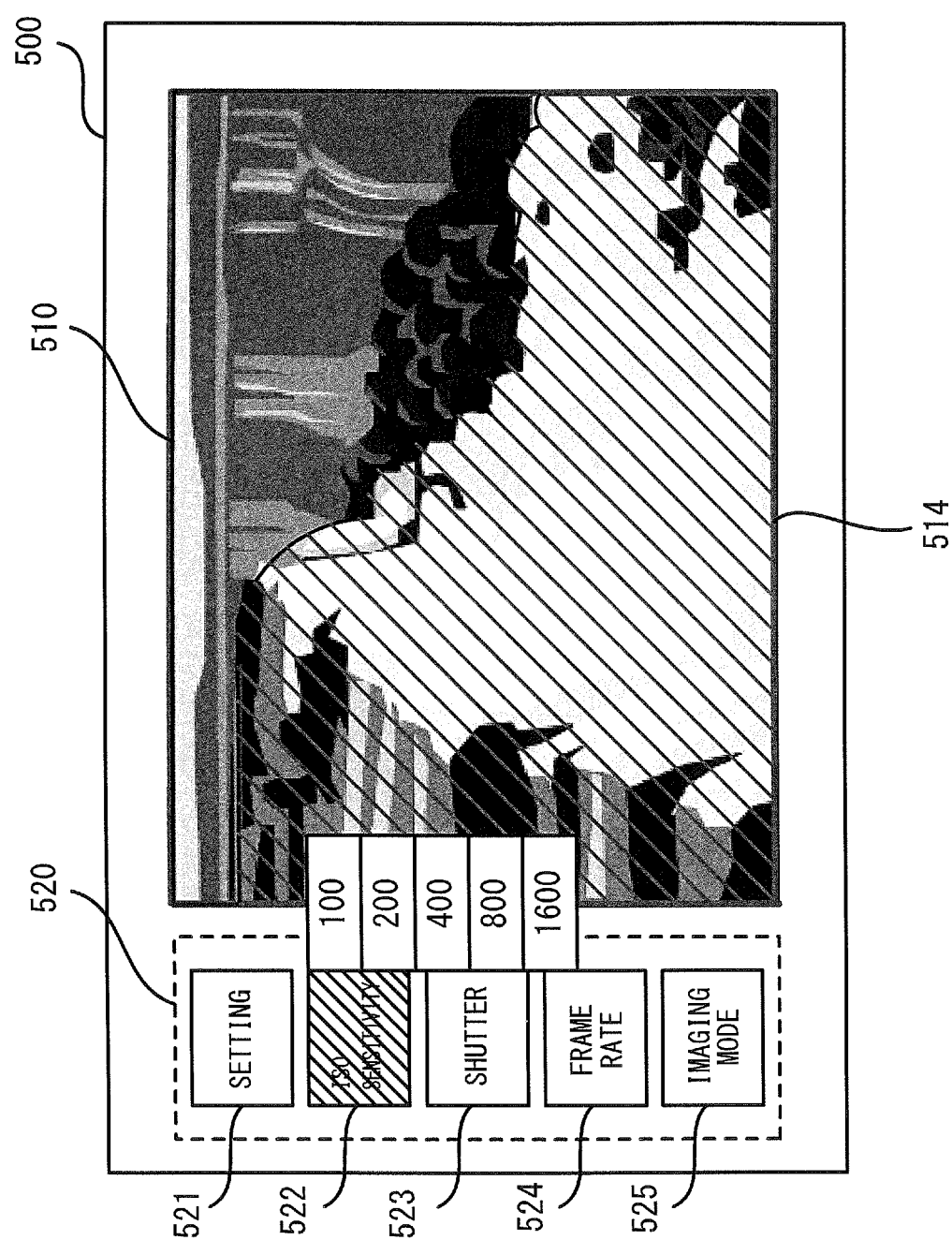
FIG. 16 is a drawing showing an example display of the display screen where a large number of blocks are set in the image display region.

In the example displays of the display screen 500 shown in FIGS. 9 to 12, large blocks are set in the image display region 510. However, blocks smaller than the blocks shown in FIGS. 9 to 12 may be set in the image display region 510. FIGS. 14 to 16 are diagrams showing an example display of the display screen where a large number of blocks are set in the image display region. In the example shown in FIGS. 14 to 16, each block includes one or some unit groups.

In selecting a region, the user touches the setting 521 and then slides a finger on the screen along the boundary of a region to be selected, as shown in FIG. 14. By using such a selection method, the region can be selected more precisely. Operations for changing image-capture conditions are similar to those described with reference to FIGS. 10 to 12. That is, first, the user selects a region 513, as shown in FIG. 14. The region 513 is a region behind a waterfall (a region hatched with white lines in FIG. 14). When the user touches the ISO sensitivity 522, multiple ISO sensitivity values appear on a side of the ISO sensitivity 522, as shown in FIG. 15. The user then sets the ISO sensitivity by touching one of the ISO sensitivity values. The user also sets the shutter speed or frame rate by touching the shutter 523 or frame rate 524.

Subsequently, the user touches the setting 521 and then selects a region 514 by sliding a finger on the screen along the boundary of the region to be selected, as shown in FIG. 16. Then, as described above, the user sets the ISO sensitivity, shutter speed, and frame rate of the region 514 by touching the ISO sensitivity 522, shutter 523, and frame rate 524. Further, as described with reference to FIGS. 9 to 12, the user can automatically change image-capture conditions for each region by touching the imaging mode 525 to change the imaging mode.

As described above, the electronic apparatus 1 according to the first embodiment includes the image-capture unit 20, which includes the image sensor 100 and can capture an image of the first and second regions, the control unit 71, which causes the display unit 50 to display a live view image corresponding to the image of the first and second regions captured by the image-capture unit 20, and the change unit 72, which makes a difference between respective accumulation conditions of the first and second regions of the live view image. By using such a configuration, it is possible to check the live view image for changes in the image corresponding to changes in the accumulation conditions for the respective regions. Accordingly, the user can change image-capture conditions for each region and generate modified images before capturing images to acquire still images or moving images. Such a process can be said to be a pre-image-capture edit of an image.

The change unit 72 is also configured to make a difference between the respective accumulation times of the first and second regions. Accordingly, the user can edit the image by making a difference between the accumulation times (shutter speeds) of the regions, check the edited image, and then capture an image. The change unit 72 is also configured to make a difference between the respective frame rates of the first and second regions. Accordingly, the user can edit the image by making a difference between the frame rates of the regions, check the edited live view image, and then capture an image. The change unit 72 is also configured to make a difference between the respective gains of the first and second regions. Accordingly, the user can edit the image by making a difference between the gains (ISO sensitivity) of the regions, check the edited image, and then capture an image.

The change unit 72 is also configured to make a difference between the respective accumulation conditions of the first and second regions on the basis of at least one of the contrast and color change of the live view image. Thus, optimum accumulation conditions can be set for each region automatically on the basis of at least one of the contrast and color change.

The electronic apparatus 1 also includes the selection unit 73, which can select between the first and second regions of the live view image. Thus, the user can select any region. The selection unit 73 can also automatically select a region corresponding to a subject in the live view image and then present the selected region to the user. The electronic apparatus 1 also includes the image combining unit 74, which causes the image sensor 100 to capture an image of at least part of the region selected by the selection unit 73 multiple times and combines the resulting images. Thus, noise can be reduced. This configuration is particularly effective when the gain is increased.

Since the selection unit 73 includes a first operation unit 52 configured to select part of a live view image, the user can select a region while visually recognizing the live view image. Since the first operation unit 52 includes a touchscreen formed on the display unit 50, the user can select a region by touching the touchscreen. Thus, the user can easily select a region with a simple operation.

Since the electronic apparatus 1 also includes the second operation unit 54 for selecting among the menus (the setting 521, ISO sensitivity 522, shutter 523, frame rate 524, and imaging mode 525 in the operation button display region 520), the user can select an image-capture condition or the like by touching the touchscreen. Thus, the user can easily select an image-capture condition or the like with a simple operation. Since the control unit 71 causes the second display unit 53 to display at least one of the gain-related menu (ISO sensitivity 522), accumulation time-related menu (shutter 523), and frame rate-related menu (frame rate 524), the user can select at least one of the gain, accumulation time, and the frame rate by touching the touchscreen. Further, since the control unit 71 display the menus near the live view image, the user can change image-capture conditions while checking changes in the live view image corresponding to changes in the image-capture conditions. Thus, usability is improved.

Examples of the electronic apparatus 1 according to the first embodiment shown in FIG. 5 include digital cameras, smartphones, mobile phones, and personal computers which each have an image capture function. The display unit 50 of the electronic apparatus 1 may be disposed outside the electronic apparatus. In this case, a communication unit configured to receive or transmit signals (image data, control signals, or the like) by wire or wirelessly is disposed in each of the system control unit 70 and display unit 50. The image processing unit 30 and system control unit 70 may be integral with each other. In this case, a system control unit including one CPU serves as the image processing unit 30 and system control unit 70 by performing processing on the basis of a control program.

Second Embodiment

While a region in the image display region 510 is manually selected in the first embodiment, a region can be automatically selected in a second embodiment. Further, in the second embodiment, a region and image-capture conditions (including accumulation conditions) are set in accordance with a movement of a moving subject. Furthermore, the second embodiment provides a function of capturing an image of only a region selected by the user or region selected automatically.

Figure 17:
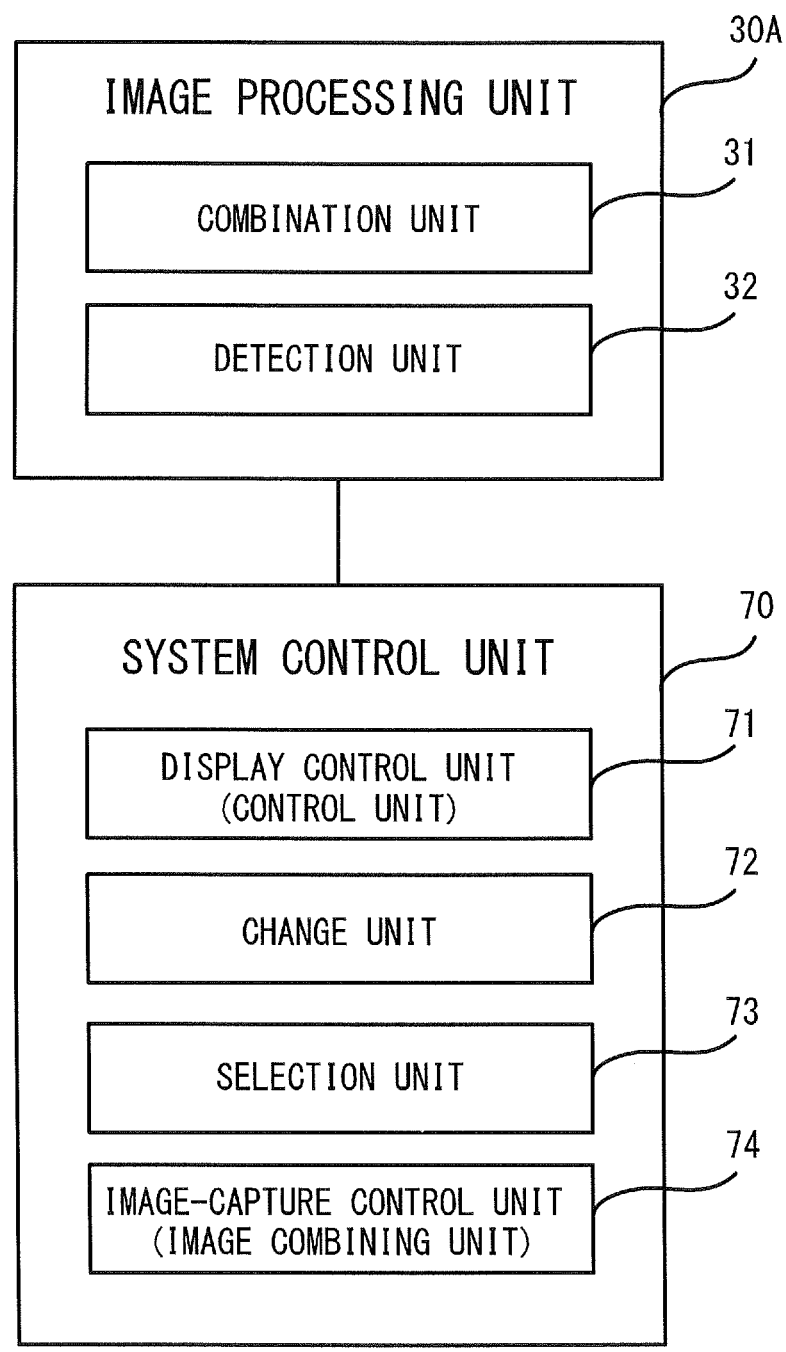
FIG. 17 is a function block diagram of an image processing unit and system control unit according to a second embodiment.

FIG. 17 is a function block diagram of an image processing unit and system control unit according to the second embodiment. As shown in FIG. 17, an image processing unit 30A includes a combination unit 31 and a detection unit 32. The configuration of the combination unit 31 is similar to that described with reference to FIG. 7 and therefore will not be described. The detection unit 32 detects a moving subject (e.g., the waterfall shown in FIG. 9 and the like). The configuration of the system control unit 70 is also similar to that described with reference to FIG. 7 and therefore will not be described. The configurations of the elements other than the image processing unit 30 and system control unit 70 (lens unit 10, image-capture unit 20, work memory 40, display unit 50, recording unit 60) are also similar to those shown in FIG. 5.

Figure 18:
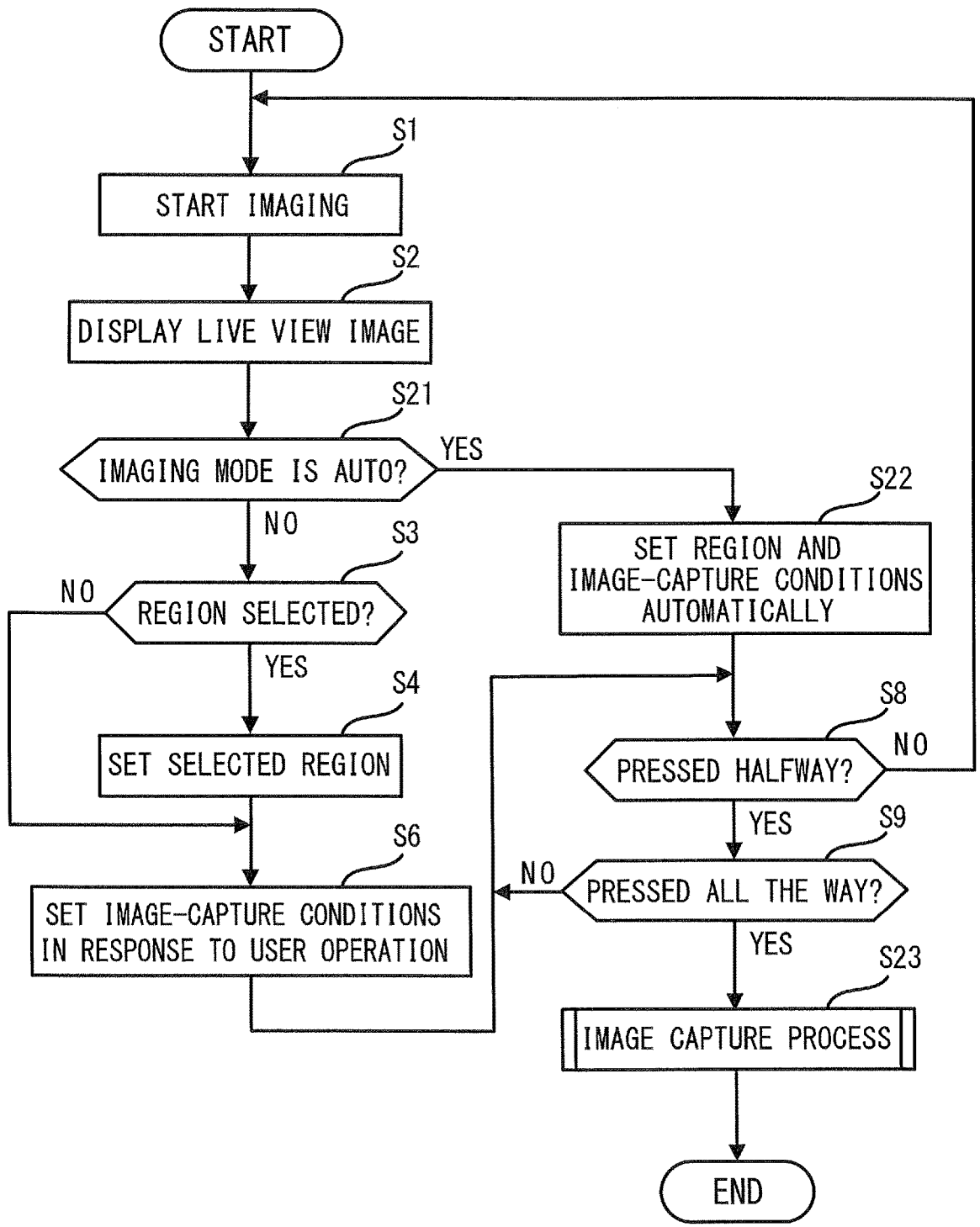
FIG. 18 is a flowchart showing an imaging operation performed by the system control unit according to the second embodiment.

Next, an imaging operation according to the second embodiment will be described. FIG. 18 is a flowchart showing an imaging operation performed by the system control unit according to the second embodiment. In the process shown in FIG. 18, the user powers on an electronic apparatus 1 and then operates an operation unit 55 or the like to start to capture images and thus the system control unit 70 starts to capture images (step S1).

Upon start of image-capture, a display control unit 71 displays a live view image captured by the image-capture unit 20 on a first display unit 51 (image display region 510) (step S2). The user then sets the imaging mode. In this case, the user touches imaging mode 525 (i.e., touch region 525a). The user then selects manual mode or auto mode from the imaging modes.

The system control unit 70 then determines whether auto mode has been selected as the imaging mode 525 (step S21). If not so, that is, a selection unit 73 determines that manual mode has been selected as the imaging mode, it performs steps similar to steps S3 and S4 shown in FIG. 8. The change unit 72 then performs a step similar to step S6 shown in FIG. 8.

In contrast, the system control unit 70 determines that auto mode has been selected as the imaging mode, the selection unit 73 automatically sets a region and image-capture conditions on the basis of the live view image displayed in the image display region 510 (step S22).

Figure 19:
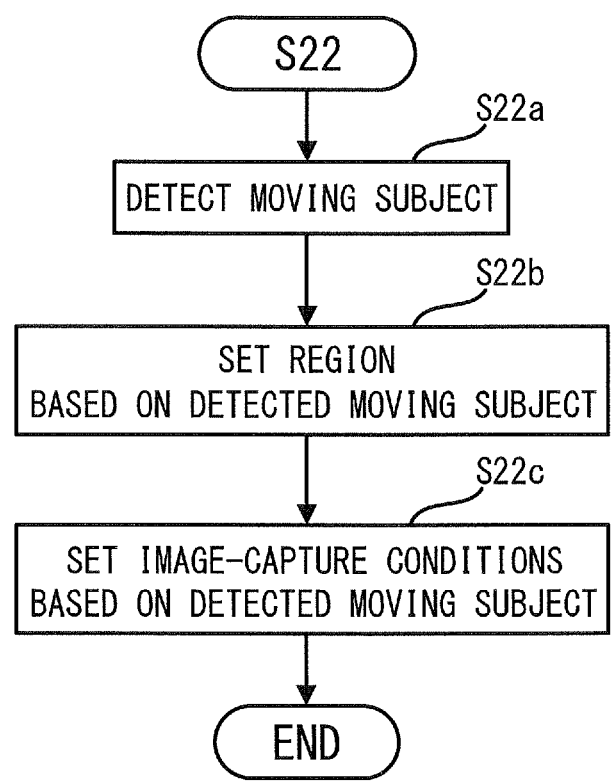
FIG. 19 is a flowchart showing an example of a region and image-capture condition automatic setting process.

FIG. 19 is a flowchart showing an example of a region and image-capture condition automatic setting process (step S22). As shown in FIG. 19, the system control unit 70 instructs an image processing unit 30 to detect moving subjects (step S22a). The detection unit 32 then detects a moving subject and a non-moving subject by making comparisons among multiple pieces of image data chronologically obtained from live view images. The detection unit 32 then outputs the detection result along with the image data to the system control unit 70. The selection unit 73 then sets a moving subject region and a non-moving subject region on the basis of the detection result from the detection unit 32 (step S22b).

The change unit 72 sets the respective image-capture conditions of the moving subject region and non-moving subject region on the basis of the detection result from the detection unit 32 (step S22c). With respect to the moving subject region, for example, the change unit 72 increases the ISO sensitivity, as well as the shutter speed. Where moving images are acquired, the change unit 72 makes the frame rate of the moving subject region higher than that of the non-moving subject region. With respect to the non-moving subject region, the change unit 72 makes the ISO sensitivity thereof lower than that of the moving subject region, as well as makes the shutter speed thereof lower than that of the moving subject region. Where moving images are acquired, the change unit 72 makes the frame rate of the non-moving subject region lower than that of the moving subject region.

Note that the region and image-capture condition automatic setting process shown in FIG. 19 is only illustrative and a region and image-capture conditions may be set using other methods. For example, if the detection unit 32 has detected no moving subject, the selection unit 73 may set a region by specifying the boundary of the region on the basis of the contrast between the bright and dark parts of the live view image or color change therein. Further, as described in the first embodiment, the change unit 72 may change image-capture conditions on the basis of at least one of the contrast and color change of the live view image portion in the region 511. Such a region and image-capture condition setting process and the process shown in FIG. 19 may be combined and performed.

Then, as in the first embodiment, the system control unit 70 determines whether the shutter or recording start button has been pressed halfway (SW1 operation) (step S8). If so, the system control unit 70 then determines whether the shutter or recording start button has been pressed all the way (SW2 operation) (step S9). If so, the image-capture control unit 74 causes the image sensor 100 to capture an image (step S23).

Figure 20:
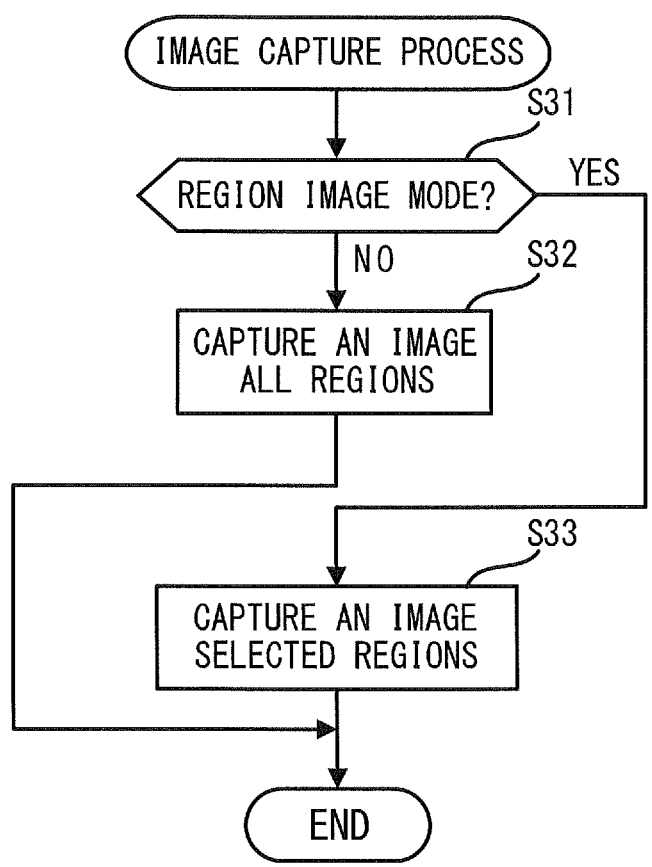
FIG. 20 is a flowchart showing an example of an image capture process according to the second embodiment.

FIG. 20 is a flowchart showing an example of an image capture process according to the second embodiment. The image-capture control unit 74 determines whether the user has set region image mode (step S31). As used herein, region image mode refers to a mode in which an image of only a region selected by the user or region set automatically is captured. Prior to the exposure process, the user sets the region image mode by operating the operation unit 55, second touchscreen 54 (e.g., imaging mode 525), or the like.

If the image-capture control unit 74 determines that region image mode has not been set, it causes the image sensor 100 to capture an image of all regions in the image display region 510 (step S32). In this case, for example, steps similar to steps S11 to S14 of FIG. 13 are performed. In contrast, if the image-capture control unit 74 determines that region image mode has been set, it causes the image sensor 100 to capture an image of only a region selected in the image display region 510 (step S33). At this time, the image of the selected region is captured under image-capture conditions set for the region.

Figure 21:
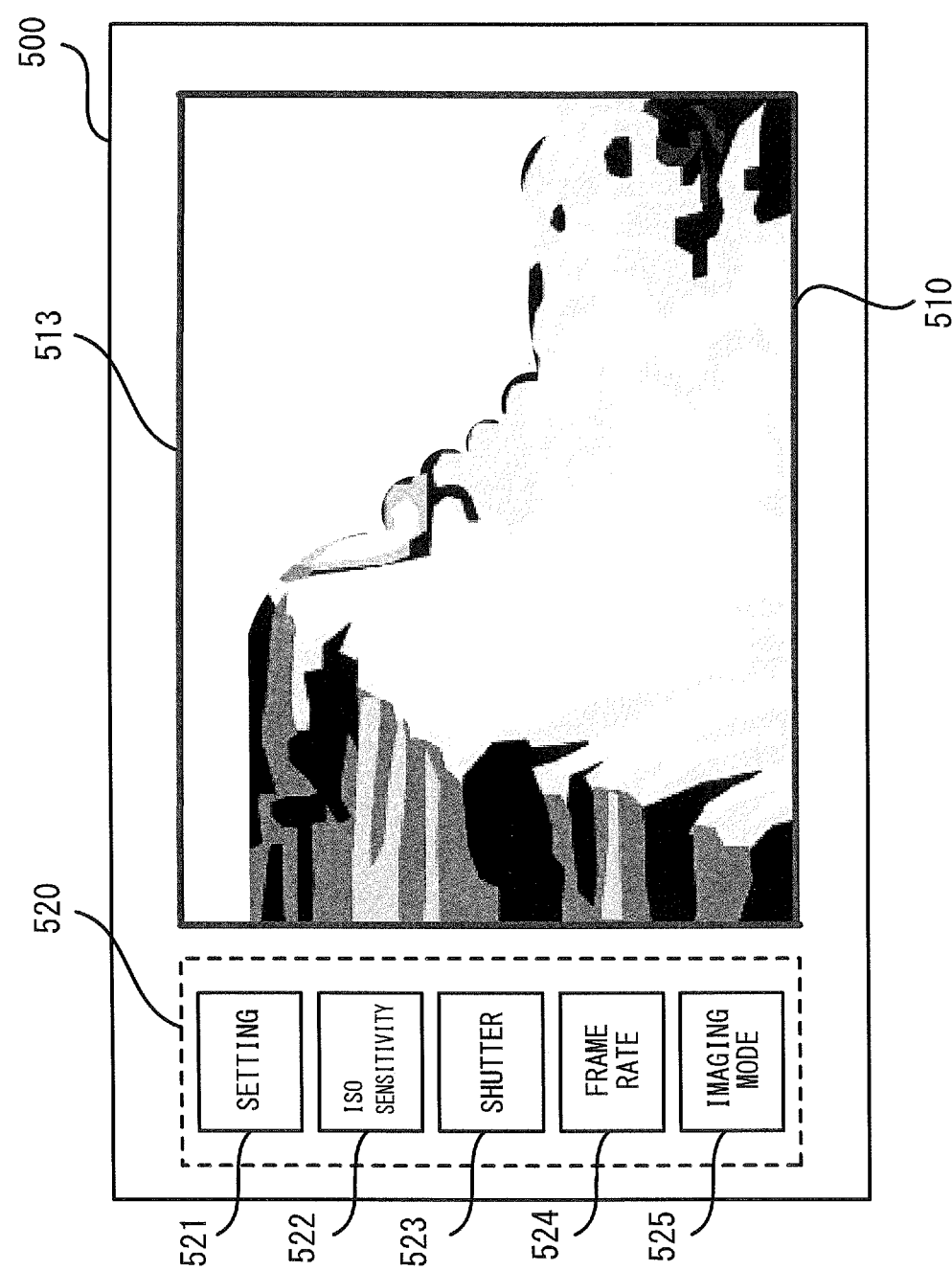
FIG. 21 is a drawing showing an example display of the display screen when an image of only a selected region is captured.

FIG. 21 is a drawing showing an example display of the display screen when the image of only the selected region is captured. As shown in FIG. 21, if a region 513 including a waterfall is selected, the image of only the region 513 is captured, and the image of the other regions are not captured.

As described above, the electronic apparatus 1 according to the second embodiment includes the detection unit 32 configured to detect a moving subject, and the change unit 72 is configured to make a difference between the respective accumulation conditions of the first and second regions on the basis of the detection result of the detection unit 32. Thus, image-capture conditions suitable for a movement of a moving subject can be set. The selection unit 73 is configured to set first and second regions on the basis of the detection result of the detection unit 32. Thus, a region including a moving subject can be surely extracted. Further, the second embodiment produces effects similar to those described in the first embodiment.

Further, the second embodiment provides the function of capturing an image of only a region selected by the user or region selected automatically. Thus, it is possible to capture an image of only a region the user wishes to capture an image. According to such a configuration, the user can acquire, for example, various useful material images.

Also in the second embodiment, the image-capture conditions which can be set for each region by the user are not limited to the ISO sensitivity, shutter speed, and frame rate. For example, there may be employed a configuration where the thinning-out rate, the number of rows or columns whose pixel signals are summed up, the digitized bit number, and the like can also be set as image-capture conditions for each region. There may also be employed a configuration where parameters such as color signal processing, white balance adjustment, gradation adjustment, and compression rate can also be set as image-capture conditions for each region.

In the second embodiment, the image processing unit 30A is implemented when a CPU performs processing on the basis of a control program.

Third Embodiment

A third embodiment provides a configuration where the electronic apparatus 1 according to the first embodiment is divided into an image-capture device 1A and an electronic apparatus 1B.

Figure 22:
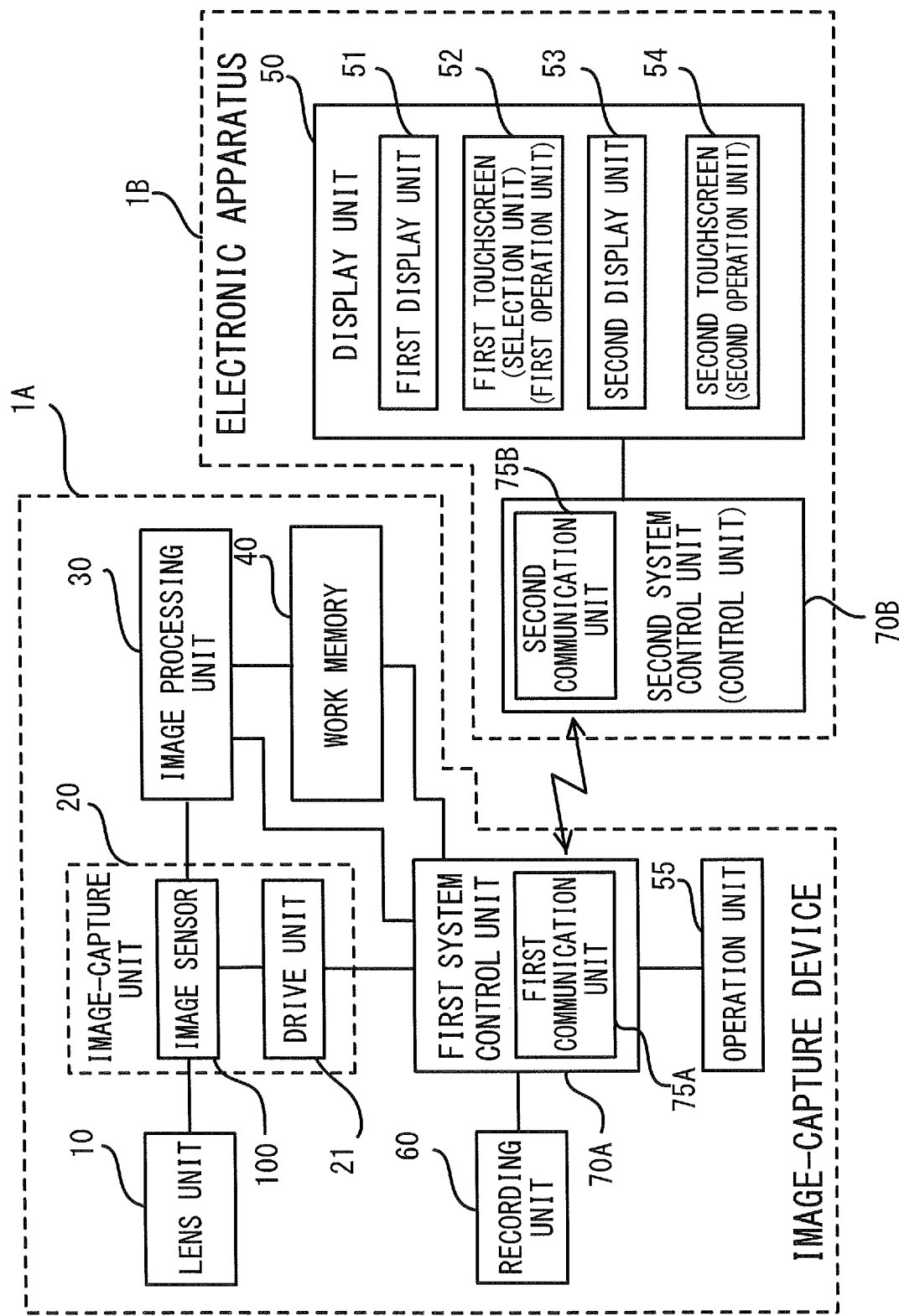
FIG. 22 is a block diagram showing the configuration of an image-capture device and electronic apparatus according to a third embodiment.

FIG. 22 is a block diagram showing the configuration of the image-capture device and electronic apparatus according to the third embodiment. In the configuration shown in FIG. 22, the image-capture device 1A captures images of a subject. The image-capture device 1A includes a lens unit 10, an image-capture unit 20, an image processing unit 30, a work memory 40, an operation unit 55, a recording unit 60, and a first system control unit 70A. The configurations of the lens unit 10, image-capture unit 20, image processing unit 30, work memory 40, operation unit 55, and recording unit 60 of the image-capture device 1A are similar to those shown in FIG. 5 and therefore will not be described repeatedly.

The electronic apparatus 1B displays images (still images, moving images, live view images). The electronic apparatus 1B includes a display unit 50 and a second system control unit (control unit) 70B. The configuration of the display unit 50 of the electronic apparatus 1B is similar to that shown in FIG. 5 and therefore will not be described repeatedly.

The first system control unit 70A includes a first communication unit 75A. The second system control unit 70B includes a second communication unit 75B. The first communication unit 75A and second communication unit 75B transmit or receive signals to or from each other by wire or wirelessly. The first system control unit 70A includes, for example, only an element equivalent to the image-capture control unit 74 of the elements shown in FIG. 7. The second system control unit 70B includes, for example, elements equivalent to the display control unit 71, change unit 72, and selection unit 73 of the elements shown in FIG. 7.

In such a configuration, the first system control unit 70A transmits image data (image data processed by the image processing unit 30, image data recorded in the recording unit 60) to the second communication unit 75B through the first communication unit 75A. The second system control unit 70B causes the display unit 50 to display the image data received by the second communication unit 75B. The second system control unit 70B also causes the second display unit 53 to display a preset menu image.

The second system control unit 70B also changes image-capture conditions (including accumulation conditions) in response to a touch on the second touchscreen 54 by the user or automatically. The second system control unit 70B also selects a region in the image display region 510 in units of blocks in response to a touch on the first touchscreen 52 by the user or automatically. The first system control unit 70A controls capturing an image in response to an operation of the shutter button (an operation unit disposed on the electronic apparatus 1B and configured to request the start of acquisition of still images or moving images) by the user.

The elements shown in FIG. 7 (display control unit 71, change unit 72, selection unit 73, and image-capture control unit 74) may be disposed in any of the first system control unit 70A and second system control unit 70B. That is, all the elements shown in FIG. 7 may be disposed in one of the first system control unit 70A and second system control unit 70B, or some of the elements shown in FIG. 7 may be disposed in the first system control unit 70A and the other elements may be disposed in the second system control unit 70B.

Examples of the image-capture device 1A include digital cameras, smartphones, mobile phones, personal computers, and the like which each have image-capture and communication functions. Examples of the electronic apparatus 1B include smartphones, mobile phones, portable personal computers, and the like which each have a communication function.

The image processing unit 30 shown in FIG. 22 is implemented when a CPU performs processing on the basis of a control program. The first system control unit 70A shown in FIG. 22 is also implemented when the CPU performs processing on the basis of the control program. The second system control unit 70B shown in FIG. 22 is also implemented when the CPU performs processing on the basis of the control program.

As described above, the electronic apparatus 1B according to the third embodiment includes: the display unit 50 capable of displaying a live view image corresponding to an image of first and second regions captured by the image-capture unit 20 including the image sensor 100; and the control unit 70B configured to cause the display unit 50 to display menus for setting image-capture conditions of the live view image while the live view image is displayed on the display unit 50. Such a configuration produces the effects described in the first embodiment, as well as allows the user to edit a live view image being captured by the image-capture device 1A using a mobile terminal such as a smartphone, to check the edited live view image, and then to capture an image.

In the configuration shown in FIG. 22, the image processing unit 30 and first system control unit 70A may be integral with each other. In this case, the system control unit including one CPU serves as the image processing unit 30 and first system control unit 70A by performing processing on the basis of a control program.

Fourth Embodiment

In the operation button display region 520 shown in FIGS. 6, 9 to 12, 14 to 16, and 21, the buttons 521 to 525 are arranged in a predetermined order. That is, the setting 521 is placed in the highest position; the ISO sensitivity 522 in the second highest position (i.e., under the setting 521); the shutter 523 in the third highest position (i.e., under the ISO sensitivity 522); the frame rate 524 in the fourth highest position (i.e., under the shutter 523); and the imaging mode 525 in the lowest position. In a fourth embodiment, on the other hand, a display control unit 71 causes the second display unit 53 to display buttons 521 to 525 in such a manner that the arrangement of the buttons is changed depending on a subject in a region. Further, in the fourth embodiment, the display control unit 71 displays a button having a higher priority with a different appearance from that of the other buttons.

Figure 23:
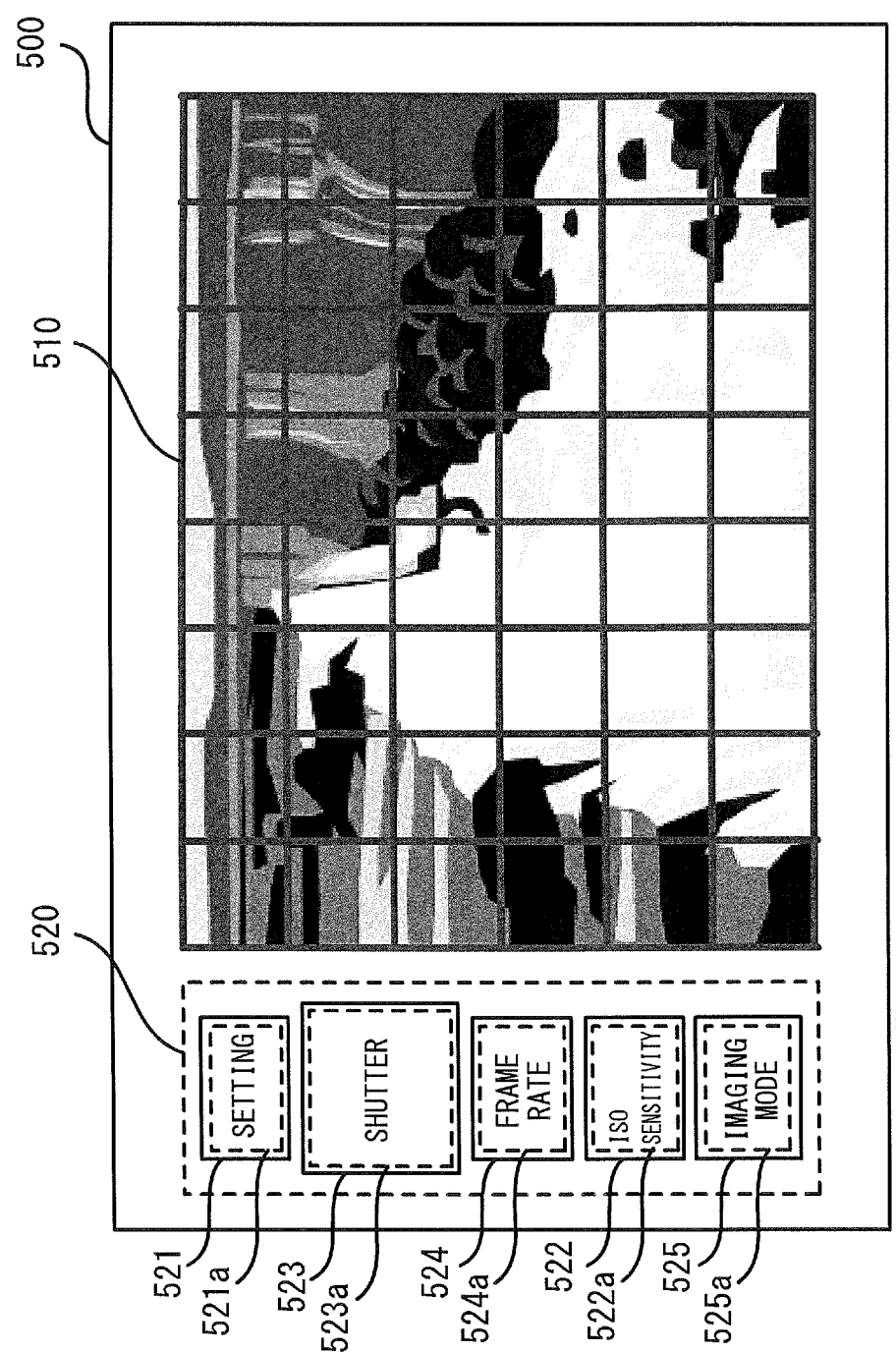
FIG. 23 is a drawing showing an example display of a display screen according to a fourth embodiment.

FIG. 23 is a drawing showing an example display of the display screen according to the fourth embodiment. In an example shown in FIG. 23, the setting 521 is placed in the highest position; the shutter 523 in the second highest position (i.e., under the setting 521); the frame rate 524 in the third highest position (i.e., under the shutter 523); the ISO sensitivity 522 in the fourth highest position (i.e., under the frame rate 524); and the imaging mode 525 in the lowest position. As shown in FIG. 23, the shutter 523 is a button larger than the other buttons (setting 521, ISO sensitivity 522, frame rate 524, imaging mode 525).

A touch region 521a of a second touchscreen 54 is formed so as to overlap the setting 521. A touch region 523a is formed so as to overlap the shutter 523. A touch region 524a is formed so as to overlap the frame rate 524. A touch region 522a is formed so as to overlap the ISO sensitivity 522. A touch region 525a is formed so as to overlap the imaging mode 525. The touch region 523a, whose size matches that of the shutter 523, is larger than the other buttons.

Next, a process of changing the arrangement of the buttons 512 to 525 performed by the image processing unit 30 and system control unit 70 will be described. In performing step S6 of FIGS. 8 and 18, the system control unit 70 instructs the image processing unit 30 to detect a moving subject. The detection unit 32 then detects a moving subject and a non-moving subject by making comparisons among multiple pieces of image data chronologically obtained from live view images. The detection unit 32 then outputs the detection result along with the image data to the system control unit 70.

The display control unit 71 then determines whether any moving subject is included in a region selected by the selection unit 73, on the basis of the detection result from the detection unit 32. If so, the display control unit 71 displays the shutter 523, which is a button for setting the shutter speed, in the second highest position, as shown in FIG. 23. At this time, the display control unit 71 displays the shutter 523 in such a manner that the shutter button is larger than the other buttons.

When the shutter speed is changed, the way the moving subject is imaged is changed. For example, assuming that the moving subject is a waterfall, when the shutter speed is increased, the image appears as if the flow of the waterfall stopped momentarily. In contrast, when the shutter speed is reduced, the image appears as if the flow of the waterfall were a thread. As seen above, for a moving subject, the shutter speed more significantly influences the way the moving subject is imaged than the other image-capture conditions. Accordingly, when a moving subject is included in the region, the display control unit 71 determines that the shutter speed has higher priority than the other image-capture conditions. The display control unit 71 then moves the position of the shutter 523 upward, as well as displays the shutter 523 as a larger button. Thus, the button having a higher priority is placed in a position in which the user can easily operate the button, thereby increasing the usability. Further, the button having high priority (i.e., image-capture condition) becomes more conspicuous than the other buttons (i.e., image-capture conditions). Thus, the user can be urged to operate the button having a higher priority.

For moving images, the frame rate significantly influences the smoothness of a movement of a moving subject. Accordingly, where moving images of a moving subject are acquired, the display control unit 71 determines that the frame rate has higher priority than the other image-capture conditions. The display control unit 71 then moves the position of the frame rate 524 upward, as well as displays the frame rate 524 as a larger button.

In the example described above, the display control unit 71 changes the arrangement and appearance (size) of the buttons on the basis of whether a subject in a region is a moving subject. However, other configurations may be employed. For example, in performing step S6 of FIGS. 8 and 18, the system control unit 70 instructs the image processing unit 30 to detect the brightness of an image portion in the region. The image processing unit 30 then detects the brightness of the image portion in the region on the basis of a corresponding live view image portion. The image processing unit 30 then outputs the detection result along with the image data to the system control unit 70.

The display control unit 71 then determines whether the brightness of the image portion in the region selected by the selection unit 73 falls within a predetermined range, on the basis of the detection result from the image processing unit 30. If not so, the display control unit 71 displays the ISO sensitivity 522, which is a button for setting the ISO sensitivity, in the second highest place. At this time, the display control unit 71 displays the ISO sensitivity 522 in such a manner that the ISO sensitivity button is larger than the other buttons.

By changing the ISO sensitivity, the dark part of the live view image portion is brightened, and the bright part thereof is darkened. If the brightness in the region does not fall within the predetermined range, that is, if the image portion in the region is too bright or too dark, it is possible to bring the exposure close to the optimum exposure by changing the ISO sensitivity. Accordingly, if the image portion in the region does not fall within the predetermined range, the display control unit 71 determines that the ISO sensitivity has higher priority than the other image-capture conditions. The display control unit 71 then moves the position of the ISO sensitivity 522 upward, as well as display the ISO sensitivity 522 as a larger button. Thus, the button having a higher priority is placed in a position in which the user can easily operate the button, thereby increasing the usability. Further, the button having a higher priority (i.e., image-capture condition) becomes more conspicuous than the other buttons (i.e., image-capture conditions). Thus, the user can be urged to operate the button having a higher priority.

Methods for displaying a button having a higher priority conspicuously include the enlargement of the button, as well as change of the button color and blinking of the button. A button having a higher priority may be made conspicuous by displaying multiple image-capture condition values on a side of the button before the user presses the button. Only the arrangement of the buttons may be changed, or only the appearance of the buttons may be changed.

The arrangement and appearance of the buttons may also be changed according to the order in which the user operates the buttons. For example, assume that the user presses the setting 521, then selects a region, then presses the imaging mode 525 to select manual mode as the imaging mode, and then changes image-capture conditions of the region. In this case, the display control unit 71 places the setting 521 in the highest position and enlarges it, then places the imaging mode 525 in the highest position and enlarges it, and then places one of the ISO sensitivity 522, shutter 523, and frame rate 524 in the highest position and enlarges it depending on a subject (image portion) in the region. By changing the arrangement and appearance of the buttons in accordance with the order in which the user operates the buttons, as described above, user convenience is improved.

While the present invention has been described using the embodiments, the technical scope of the invention is not limited to the scope described in the embodiments. Various changes or modifications can be made to the embodiments without departing from the spirit and scope of the invention. One or more of the elements described in the embodiments may be omitted. Aspects resulting from such changes, modifications, or omission are also included in the technical scope of the invention. Further, the elements of the embodiments or modifications may be combined as appropriate and used.

For example, in the first and second embodiments, the electronic apparatus 1 does not need to include the lens unit 10, recording unit 60, or the like as long as it includes the image-capture unit 20 and the system control unit 70 including the control unit 71 and change unit 72. That is, these elements may be disposed separately from the electronic apparatus 1. Also for the image-capture device 1A according to the third embodiment, the lens unit 10, recording unit 60, or the like may be disposed separately therefrom.

While the color filters 102 form Bayer arrays in the embodiments, they may form other types of arrays. Each unit group 131 only has to include at least one pixel. Each block also only has to include at least one pixel. Accordingly, it is also possible to capture an image under image-capture conditions which vary among the pixels.

Further, in the embodiments, part or all of the drive unit 21 may be included in the image-capture chip 113 or signal processing chip 111. Part of the image processing unit 30 may be included in the image-capture chip 113 or signal processing chip 111. Part of the system control unit 70 may be included in the image-capture chip 113 or signal processing chip 111.

While all of the ISO sensitivity, shutter speed, and frame rate can be changed as image-capture conditions in the embodiments, at least one of these only has to be changeable. Where the image-capture conditions are automatically set, best mode image-capture conditions under which optimum exposure is achieved may be presented to the user, or live view images among which the image-capture conditions are changed in stages may be presented to the user.

While the operation button display region 520 is located near the image display region 510 in the embodiments, it may be located in a position which is not near the image display region 510. The operation button display region 520 may also be located in a position which is superimposed on the image display region 510. The user may operate the operation unit 55 rather than touching the second touchscreen 54.

While the configuration where the user operates the first touchscreen 52 to select a region and then operates the second touchscreen 54 to set image-capture conditions or the like is employed in the embodiments, there may be employed other configurations, including one where the user selects a region and sets image-capture conditions or the like by operating the operation unit 55.

In the first embodiment, the user sets a region manually and makes a selection as to whether to set image-capture conditions manually or automatically by setting the imaging mode. In the second embodiment, the user makes a selection as to whether to set a region and image-capture conditions manually or automatically by setting the imaging mode. Alternatively, the user may set both a region and image-capture conditions manually. Alternatively, the user may set a region automatically and then make a selection as to whether to set image-capture conditions manually or automatically by setting the imaging mode.

While the size of the blocks is previously set in the embodiments, there may be employed a configuration where the user sets the size of the blocks. In the first embodiment, there have been described the example where a few number of blocks are set in the image display region 510 (FIGS. 9 to 12) and the example where a large number of blocks are set in the image display region 510 (FIGS. 14 to 16). Alternatively, the system control unit 70 (selection unit 73) may automatically set large blocks and small blocks. For example, the system control unit 70 (selection unit 73) automatically identifies the boundary of a region. Then, if the boundary of the region crosses a large block, the system control unit 70 (selection unit 73) sets small blocks in the large block. The system control unit 70 then defines the region along the boundary in units of small blocks.

In the embodiments, it is assumed that the image-capture conditions of a live view image being displayed on the first display unit 51 are the same as the image-capture conditions of an image captured in response to a shutter operation. This is intended to ensure that an image to be actually acquired can be checked using a live view image. However, the image-capture conditions of a live view image may be different from those of an image to be actually acquired. In this case, changes are made to the image-capture conditions to the extent that the user can recognize an image to be actually acquired using a live view image.

DESCRIPTION OF REFERENCE SIGNS 1, 1B: electronic apparatus, 1A: image-capture device, 20: image-capture unit, 30, 30A: image processing unit, 31: combination unit, 32: detection unit, 50: display unit, 51: first display unit, 52: first touchscreen (selection unit, first operation unit), 53: second display unit, 54: second touchscreen 54 (second operation unit), 70: system control unit, 70A: first system control unit, 70B: second system control unit (control unit), 71: display control unit (control unit), 72: change unit, 73: selection unit, 74: image-capture control unit (image combining unit), 100: image sensor

The invention claimed is:

1. An electronic apparatus comprising:
an image sensor including a pixel region which includes a first region and a second region located on a side in a row direction from the first region and in which a plurality of pixels are disposed, a first control line which is connected to a first pixel disposed in the first region and to which a first control signal for controlling the first pixel is outputted, and a second control line which is connected to a second pixel disposed in the second region and to which a second control signal for controlling the second pixel is outputted;
a processor that is capable of setting image-capture conditions of each of the first region and the second region to be different from each other; and
a controller that causes a display to display a live view image of a subject captured in each of the first region and the second region under the image-capture conditions set by the processor, wherein
the image sensor includes an image-capture chip including a first semiconductor substrate and a signal processing chip including a second semiconductor substrate connected to the first semiconductor substrate,
the pixel region is disposed in the image-capture chip,
the pixel region is divided into a plurality of rows and a plurality of columns, and
the first and second regions of the pixel region are disposed in a same row of the plurality of rows.

2. The electronic apparatus of claim 1, wherein
the first pixel includes a first photoelectric converter that converts light to charge and a first transfer gate that transfers the charge resulting from conversion by the first photoelectric converter to a first floating diffusion,
the second pixel includes a second photoelectric converter that converts light to charge and a second transfer gate that transfers the charge resulting from conversion by the second photoelectric converter to a second floating diffusion,
the first transfer gate is connected to the first control line and transfers based on the first control signal the charge of the first photoelectric converter to the first floating diffusion, and
the second transfer gate is connected to the second control line and transfers based on the second control signal the charge of the second photoelectric converter to the second floating diffusion.

3. The electronic apparatus of claim 2, wherein
the image sensor includes a first signal line that is connected to the first pixel and to which a first signal based on the charge resulting from conversion by the first photoelectric converter is outputted and a second signal line that is connected to the second pixel and to which a second signal based on the charge resulting from conversion by the second photoelectric converter is outputted.

4. The electronic apparatus of claim 1, further comprising a selector that causes either of the first region and the second region to be selected.

5. The electronic apparatus of claim 4, wherein
the selector causes said either of the first region and the second region to be selected using a selection member.

6. The electronic apparatus of claim 5, wherein
the selector causes said either of the first region and the second region to be selected by using a touchscreen disposed on the display.

7. The electronic apparatus of claim 4, wherein
the controller causes the display to display an image for setting to be used to set the image-capture conditions of said region that has been selected among the first region and the second region by the selector, and the processor sets the image-capture conditions of the region that has been selected by the selector by using the image for setting.

8. The electronic apparatus of claim 2, wherein
the processor sets timing at which the first transfer gate transfers the charge from the first photoelectric converter to the first floating diffusion and timing at which the second transfer gate transfers the charge from the second photoelectric converter to the second floating diffusion.

9. The electronic apparatus of claim 3, wherein
the image sensor includes a first converter that converts the first signal outputted to the first signal line into a digital signal and a second converter that converts the second signal outputted to the second signal line into a digital signal, and
the first converter and the second converter are disposed in the signal processing chip.

10. An electronic apparatus comprising:
an image sensor including a plurality of pixels, a first control line, and a second control line, the plurality of including a first pixel and a second pixel, the first control line being connected to the first pixel and outputting a first control signal that controls the first pixel, and the second control line being connected to the second pixel and outputting a second control signal that controls the second pixel;
a processor that is capable of setting image-capture conditions of each of the first pixel and the second pixel to be different from each other; and
a display that displays a live view image of a subject captured in each of the first pixel and the second pixel under the image-capture conditions set by the processor, wherein
the image sensor includes an image-capture chip including a first semiconductor substrate and a signal processing chip including a second semiconductor substrate connected to the first semiconductor substrate,
the plurality of pixels is disposed in the image-capture chip,
the plurality of pixels is divided into a plurality of rows and a plurality of columns, and
the first and second pixels of the plurality of pixels are disposed in a same row of the plurality of rows.

11. The electronic apparatus of claim 10, wherein
the first pixel includes a first photoelectric converter that converts light to charge and a first transfer gate that transfers the charge resulting from conversion by the first photoelectric converter to a first floating diffusion,
the second pixel includes a second photoelectric converter that converts light to charge and a second transfer gate that transfers the charge resulting from conversion by the second photoelectric converter to a second floating diffusion,
the first transfer gate is connected to the first control line and transfers based on the first control signal the charge of the first photoelectric converter to the first floating diffusion, and
the second transfer gate is connected to the second control line and transfers based on the second control signal the charge of the second photoelectric converter to the second floating diffusion.

12. The electronic apparatus of claim 11, wherein
the image sensor includes a first signal line that is connected to the first pixel and to which a first signal based on the charge resulting from conversion by the first photoelectric converter is outputted and a second signal line that is connected to the second pixel and to which a second signal based on the charge resulting from conversion by the second photoelectric converter is outputted.

13. The electronic apparatus of claim 10, further comprising
a selector that causes either of the first pixel and the second pixel to be selected.

14. The electronic apparatus of claim 13, wherein
the selector causes said either of the first pixel and the second pixel to be selected using a selection member.

15. The electronic apparatus of claim 14, wherein
the selector causes said either of the first pixel and the second pixel to be selected by using a touchscreen disposed on the display.

16. The electronic apparatus of claim 13, wherein
the controller causes the display to display an image for setting to be used to set the image-capture conditions of said pixel that has been selected among the first pixel and the second pixel by the selector, and
the processor sets the image-capture conditions of said pixel that has been selected by the selector by using the image for setting.

17. The electronic apparatus of claim 11, wherein
the processor sets timing at which the first transfer gate transfers the charge from the first photoelectric converter to the first floating diffusion and timing at which the second transfer gate transfers the charge from the second photoelectric converter to the second floating diffusion.

18. The electronic apparatus of claim 10, wherein
the image sensor includes a first converter that converts the first signal outputted to the first signal line into a digital signal and a second converter that converts the second signal outputted to the second signal line into a digital signal, and
the first converter and the second converter are disposed in the signal processing chip.

* * * * *